United States Patent

Kolls

[11] Patent Number: 6,056,194
[45] Date of Patent: May 2, 2000

[54] SYSTEM AND METHOD FOR NETWORKING AND CONTROLLING VENDING MACHINES

[75] Inventor: Brock Kolls, Phoenixville, Pa.

[73] Assignee: USA Technologies, Inc., Wayne, Pa.

[21] Appl. No.: 08/793,588

[22] PCT Filed: Aug. 28, 1995

[86] PCT No.: PCT/US95/10921

§ 371 Date: Feb. 27, 1997

§ 102(e) Date: Feb. 27, 1997

[87] PCT Pub. No.: WO96/07134

PCT Pub. Date: Mar. 7, 1996

[51] Int. Cl.[7] .................. G07F 7/04; G06F 7/08
[52] U.S. Cl. .................. 235/381; 235/380; 235/382; 235/382.5; 902/23; 902/32
[58] Field of Search .................. 235/381, 382, 235/380, 382.5; 902/23, 32

[56] References Cited

U.S. PATENT DOCUMENTS

| | | | |
|---|---|---|---|
| 4,267,915 | 5/1981 | McLaughlin et al. | 194/1 |
| 4,412,292 | 10/1983 | Sedam et al. | 364/479 |
| 4,498,570 | 2/1985 | King et al. | 194/1 |
| 4,767,917 | 8/1988 | Ushikubo | 235/381 |
| 4,853,684 | 8/1989 | Hoppstadter | 340/825.25 |
| 4,884,212 | 11/1989 | Stutsman | 364/479 |
| 4,947,028 | 8/1990 | Gorog | 235/381 |
| 4,949,257 | 8/1990 | Orbach | 364/401 |
| 5,091,713 | 2/1992 | Horne et al. | 340/541 |
| 5,147,021 | 9/1992 | Maruyama | 235/381 |
| 5,206,488 | 4/1993 | Teicher | 235/380 |
| 5,225,977 | 7/1993 | Hooper et al. | 364/401 |
| 5,239,480 | 8/1993 | Huegel | 235/381 |
| 5,303,844 | 4/1994 | Muehlberger | 235/381 |
| 5,398,799 | 3/1995 | Rannon et al. | 194/216 |
| 5,440,108 | 8/1995 | Tran et al. | 235/381 |
| 5,442,629 | 8/1995 | Geyer et al. | 370/84 |
| 5,445,295 | 8/1995 | Brown | 235/381 |
| 5,450,938 | 9/1995 | Rademacher | 235/381 |
| 5,511,114 | 4/1996 | Stimson et al. | 235/380 |
| 5,621,796 | 4/1997 | Davis et al. | 380/24 |
| 5,637,845 | 6/1997 | Kolls | 235/381 |
| 5,728,999 | 3/1998 | Teicher | 235/381 |
| 5,769,269 | 6/1998 | Peters | 221/7 |

*Primary Examiner*—Donald Hajec
*Assistant Examiner*—Douglas X. Rodriguez
*Attorney, Agent, or Firm*—Ratner & Prestia

[57] ABSTRACT

A vending machine control system and method for controlling vending of items from one or more vending machines having a coin acceptor interface and selection controls for selecting items to vend. Control system and method are provided for sending and receiving information to and from each of the vending machines to control the vending of items to users. Network system and method are connected to each of the coin acceptor interfaces for facilitating communication between the control system and the vending machine.

11 Claims, 16 Drawing Sheets

6,056,194

SYSTEM AND METHOD FOR NETWORKING AND CONTROLLING VENDING MACHINES

RELATED APPLICATION

This is a continuation-in-part application of the application of common assignment herewith of inventor Brock Kolls, entitled UNIVERSAL VENDING MACHINE CONTROL SYSTEM AND METHOD, Ser. No. 08/298,067, filed on Aug. 29, 1994 and CREDIT AND BANK ISSUED DEBIT CARD OPERATED SYSTEM AND METHOD FOR CONTROLLING A PREPAID CARD ENCODING/DISPENSING MACHINE, filed Jun. 13, 1995 (no serial number yet issued).

FIELD OF THE INVENTION

The present invention relates to automated dispensing equipment which dispenses products or services (hereinafter collectively referred to as vending machines) and more particularly, to the networking of multiple vending machines for operation by credit cards, debit cards, pre-pay cards, cash or coins.

BACKGROUND OF THE INVENTION

Credit and bank issued debit cards have been in wide spread use for many years. Until recently, the majority of uses of these cards are "attended uses", requiring personnel of the business establishment, or attendants, to process and complete a sale or transaction using a credit or bank issued debit card.

In the past, credit card transactions were made by imprinting information stamped on a credit card onto a multi part credit card receipt using a forced-contact device. It was a common business practice to contact a credit card company by telephone to verify the availability of credit on the card to ensure that there was sufficient credit to complete the transaction. If sufficient credit was available, the credit card company and\or credit card processor company provided an authorization number over the telephone which was manually printed onto the credit card receipt.

Magnetic strip technology has largely made the forced-contact devices unnecessary and has allowed for the expansion of credit card and bank issued debit card transactions. Using magnetic strip technology, information concerning a credit card (or bank issued debit card) an owner's account number is stored as magnetic information on a magnetic strip attached to a credit card or bank issued debit card. By passing the magnetic strip through a magnetic card reader the information about an individual's credit card (or bank issued debit card) account can be read. The information can then be transmitted over telephone lines to the credit card company (or other authorization service) to obtain an authorization for a particular credit card transaction. Imprints of credit card information onto a receipt using a forced-contact device is no longer necessary, as magnetic information is output to a printer which outputs credit card (or bank issued debit card) information (such as the credit card account number or bank issued debit card number) and the transaction information (such as amount, date and store where purchase was made) onto a receipt for the credit card owner.

An alternative to a magnetic strip is an embedded semiconductor device (i.e. memory and/or microprocessor) which can store information for access during a transaction.

Various self-service devices using credit cards and bank issued debit cards have been appearing in the marketplace. Automatic Teller Machines (ATMs) have allowed users to deposit, withdraw and transfer funds to and from bank accounts. Originally ATMs were only used with bank issued debit cards. It is now possible to use credit cards for transactions, such as withdrawals, at ATMs (this may be more accurately described as a loan against an available credit line). Neither credit cards or bank issued debit cards contain information about account content. Account content is stored on the computer of a credit card company or bank. This information is accessed with the credit card or bank issued debit card.

In the vending field, credit cards and bank issued debit cards can be used directly at the pumps at self-service gas stations for dispensing gasoline. Although self-service, this type of vend is still referred to as an attended vend (or attended transaction), as an operator must always be on duty at the gas station. Credit cards can also be used on airplanes for personal telephone calls. This use is also considered an attended transaction as flight attendants are available, as well as a telephone operator for assistance, collect calls, information, etc.

Vending machines, such as copy machines or food machines (e.g. soda machines or candy machines), are often used in a completely unattended state. After normal working hours in libraries, office buildings, post office, court houses or copy facilities, users can still operate a copy machine or food machine using either coins, cash or private debit cards. Private (non-bank issued) debit cards are often referred to as "stored value cards" or "prepaid cards" or "vending cards". Prepaid cards differ from bank issued debit cards in that prepaid cards have a cash value encoded on the card's magnetic strip (or, alternatively, on an embedded semiconductor device). The prepaid card does not require a connection to a database, as do bank issued debit cards and credit cards, to determine if a transaction is within an available credit limit (for a credit card) or within an available balance (for a bank issued debit card). Prepaid cards have been used to solve some of the problems associated with coin operated vending machines.

Coin operated machines require that a user have sufficient change to purchase the products, make the copies or purchase the services which a user has selected. For example, a user/purchaser may not, before arriving at a vending location, be aware that the selection is available or be aware of the cost of the items in the vending machines. Further, if a user seeks to purchase many items, a large amount of change is necessary. Carrying a sufficient amount of change is burdensome because of the weight and space taken up by the coins, as well as the need to acquire the coins from a bank or other establishment. Carrying large amounts of change may be conspicuous and can pose security problems for a user, particularly late at night in a library, for example.

Although coin changers are often found in the vicinity of coin operated vending machines, coin changers can run out of change or be the targets of vandals, causing problems during unattended use. In addition, there is a lack of accountability, as there is no receipt for transactions. From an operator's perspective, problems with coin operated vending machines include vandalism, theft, inaccurate counting/reporting, collection and depositing.

Prepaid card operated vending machines, such as copy machines, use a magnetic card reader typically located in a central location or attached to the vending machines. To obtain a prepaid card, some present systems allow the purchase of a pre-paid card with a dollar value (or transaction value) already encoded. Other present systems use either an operator to carry out the encoding of the prepaid amount on the magnetic card (sometimes referred to as a "copy card"), or a machine analogous to a change machine for dispensing a new prepaid card and/or encoding a new prepaid amount onto an existing prepaid card.

During unattended use, however, both of these means for obtaining a prepaid card may be inoperable. In the first instance, an attendant is not available during unintended use to encode a purchased amount on an existing prepaid card or issue a new card. In the case of a prepaid card dispensing machine, sufficient change or cash must still be carried by the user to operate such a machine.

Further, generally, both existing coin and prepaid card operated vending machines do not provide transaction information concerning the type of transaction, location, duration, time and other items of marketing and operation information concerning the various transactions. This information can prove useful to the operator of vending machines. The lack of marketing and operation information is compounded if multiple vending machines are located at a particular site or owned by single entity (as is often the case). An operator has to monitor the vending machines by going to the vending location-in order to determine the number of items sold. Operators typically inventory a vending machine, fill the order from a truck or car, and then reload the vending machine. Alternatively and equally inefficient, an operator may carry enough items to refill the entire vending machine each time the vending machine is visited to avoid making multiple trips between a car/truck and the vending machine. Again, the problems associated with monitoring and filling vending machines is compounded if there are multiple vending machines at a single location.

Another problem which arises with current vending machines is the need to make change for every transaction. If a user is vending from several machines, as is common with food and beverage machines, currency/coins must be inserted in each separate machine in order to complete the vending transaction.

Recent trends in the vending industry have sought to replace expensive single price coin changers/controllers with a less expensive coin acceptor device. The driving force behind this move has been the desire to have multi-price capabilities. Multi-pricing is the vending of different products in a single vending machine at different prices. In the past, more expensive coin mechanisms tallied the deposited coins and made appropriate change after a user completed the user's vend selection. Less expensive coin changers relied on the vending machine's controllers to count the incoming coins, operate the vending cycle and make change.

The vending industry has adopted a standard coin changer interface, commonly referred to as the "micromech" interface. This interface includes a communication protocol and wiring configuration for controlling a single vending machine, via a single coin changer. The vending industry, through the National Automated Merchandising Association (NAMA) has developed standards on protocol and wire connections. Table 1 is a list of the hard wired connections associated with the industry standard coin changer.

TABLE 1

| 15 Pin Version | 12 Pin Version |
|---|---|
| Pin 1 - (+)5 VDC | Pin 1 - (+)5 VDC |
| Pin 2 - 5 V Return | Pin 2- 5 V Return |

TABLE 1-continued

| 15 Pin Version | 12 Pin Version |
|---|---|
| Pin 3 - SEND | Pin 3 - SEND |
| Pin 4 - INT | Pin 4 - INT |
| Pin 5 - DATA | Pin 5 - DATA |
| Pin 6 - ACCEPT ENABLE | Pin 6 - ACCEPT ENABLE |
| Pin 7 - Dispense $0.25 | Pin 7 - Dispense $0.25 |
| Pin 8 - Dispense $0.10 | Pin 8 - Dispense $0.10 |
| Pin 9 - Dispense $0.05 | Pin 9 - dispense $0.05 |
| Pin 10 - (+)12O VDC | Pin 10 - 24 VDC |
| Pin 11 - RESET | Pin 11 - RESET |
| Pin 12 - (+)12O VDC | Pin 12 - (+)24 VDC |
| Pin 13 - 24 VDC Return | |
| Pin 14 - Dispense $1.00 | |
| Pin 15 - (+)24 VDC | |

Under this standard, when a coin is deposited, the coin changer sets the INT line active. This activity requests permission from the vending machine controller to transmit data. When the vending machine responds by setting the SEND line active, the coin changer sends a one byte instruction via the DATA line to the vending machine controller. The controller then sets the SEND line to its inactive state. If the vending machine controller desires to recheck the transmitted data, the SEND line can be set to an active state for a second time. Setting the SEND line to an active state for a second time forces the coin changer to send the same byte (information) a second time. The one byte instruction includes information, such as the type of coins deposited, whether the coin tubes (containing the coin changer mechanism for dispensing change) are full and other status information.

At the discretion of the vending machine controller, coins may be ejected by activating one of three control lines. In the typical prior art configuration, when the QUARTER RETURN is activated a quarter is ejected into the coin return. A similar operation occurs for the dimes and nickels. In addition, the vending machine controller has the ability to enable and disable the coin changer via the ACCEPT ENABLE and RESET lines.

SUMMARY OF THE INVENTION

The present invention comprises a vending machine control system and method for controlling vending of items from one or more vending machines. Each of the vending machines has a coin acceptor interface and selection controls for selecting items to vend.

Control means are provided for sending and receiving information to and from each of the vending machines to control the vending of items to users. Network means are connected to each of the coin acceptor interfaces for facilitating communication between the control means and the vending machines.

BRIEF DESCRIPTION OF THE FIGURES

The invention will be described by way of non-limiting example, with reference to the attached drawings in which.

DETAILED DESCRIPTION OF THE INVENTION

Figure 1:
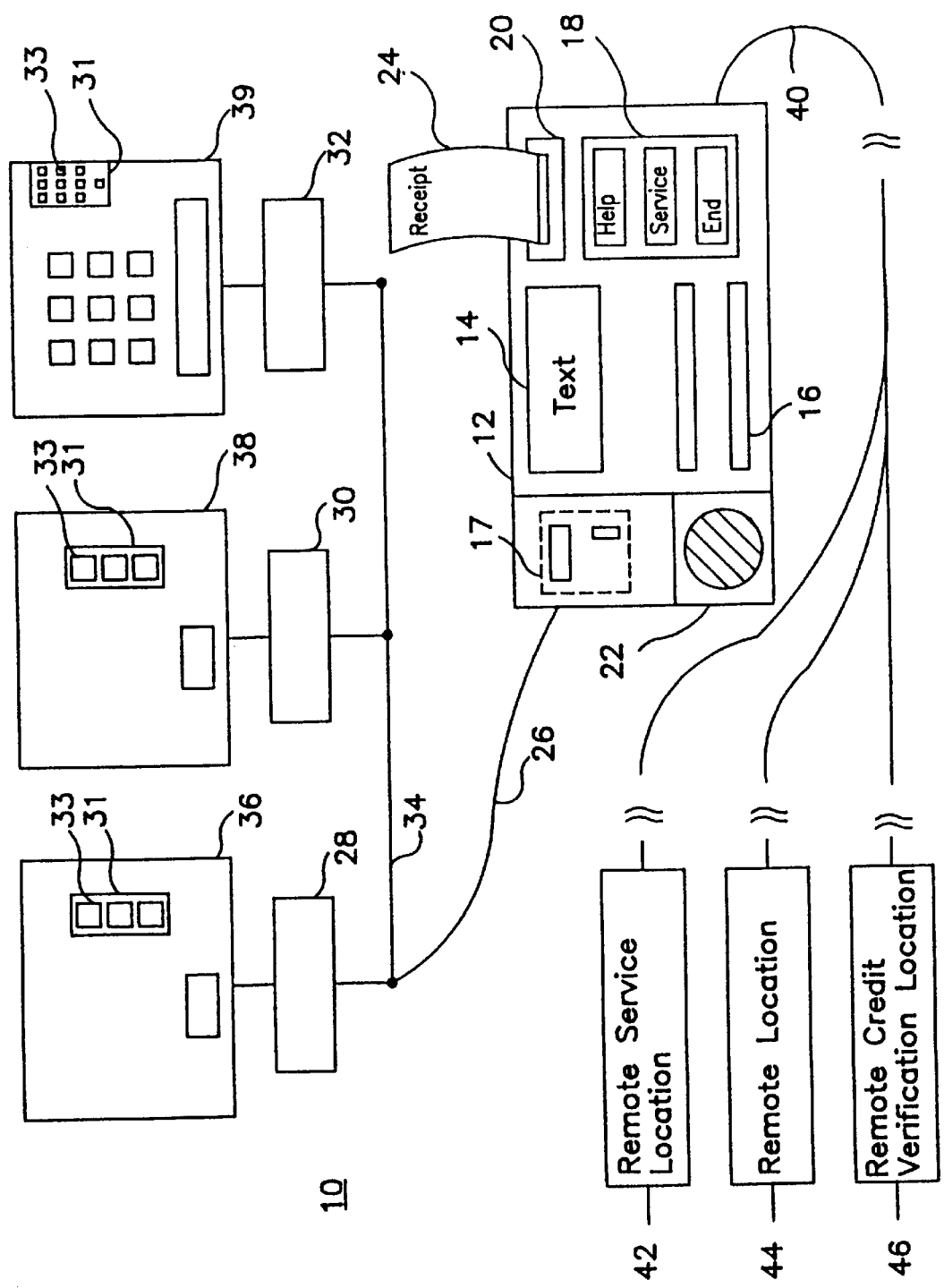
FIG. 1 shows a diagram of the present invention controlling vending machines and interfacing with remote locations.

There is shown in FIG. 1 a system 10, which is an exemplary embodiment of the present invention. System 10 has three vending machines 36, 38 and 39 connected to a network control line 34, through network nodes 28, 30 and 32, respectively. Fewer or greater number of vending machines may be used in System 10. In an exemplary embodiment, network control line 34 is a serial communications line in accordance with the RS232 serial communication protocol. Other communication protocols can also be used, such as RS485, as will be understood by those skilled in the art. Vending machines 36, 38 and 39 are examples of multiple vending machines under control by a single vending machine control system (controller) 12. These vending machines may dispense (vend) food and beverages. Laundry machines are also well suited for control by a single vending machine control system in accordance with the present invention. Still other types of vending machines, such as microfiche machines and computer operated devices for on-line searching, database searching or printing may be used as vending machines instead of vending machine 36, 38, and 39. In combination, business related vending machines could, possibly form a mini-office all controlled by a single controller 12.

The network of an exemplary embodiment of the present invention is a serial communication network using the RS232 protocol. Network nodes, such as network nodes 28, 30 and 32 are connected to controller 12 via connection lines 34 and 26. Each network node is also connected to a separate vending machine, such as vending machines 36, 38 and 39, respectively.

Figure 11:
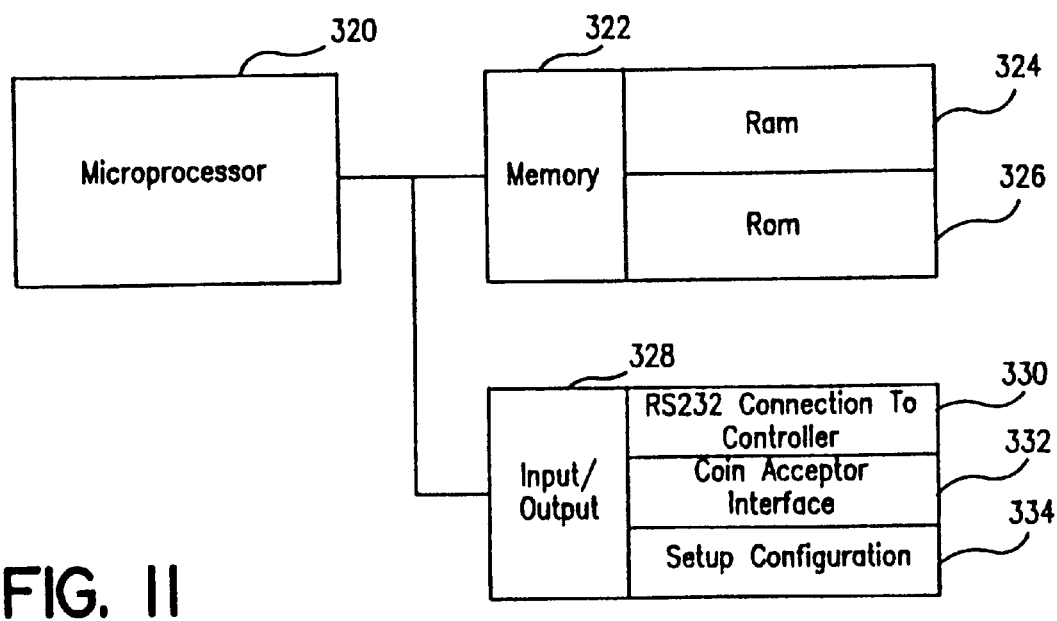
FIG. 11 shows a schematic block diagram of a network node in accordance with the present invention.

A schematic block diagram for an exemplary network node is shown in FIG. 11. It is comprised of a microprocessor 320, a memory 322 and an Input/Output (I/O) 328. I/O 328 provides a communication link to both controller 12 and to a respective vending machine 36, 38 or 39. Each network node contains a unique address. this unique address allows controller 12 to request and conduct communications with a selected network node (if the present invention is used with a multi-node, multi-vending machine arrangement).

Controller 12 sends commands to a selected network node, requesting the network node to communicate its status and the status of the vending machine to which it is attached. Status may include—current vend status of the vending machine (ready to vend/not ready to vend), product selection and availability, operational flags, inventory of items vended and pricing information required by controller 12. "Pricing" information may be address pricing as described below or actual item pricing.

Controller 12 can also program the network node and enable, disable the vending machine connected to the selected network node. This programming can be done to either a selected network node or selected groups of network nodes in a multi-node, multi-vending machine arrangement. In addition, all network nodes (if more than one) can be communicated with simultaneously.

An exemplary network node interfaces with a vending machine through the coin changer interface of the vending machine. In this way, the network node can manage the operation of the vending machine, allow or refuse vends and record information concerning the vending machine. This information may include—items selected, amount of money spent on items, date and time of sales and status/maintenance of the vending machine.

Network nodes 28, 30, 32 allow vends on their attached, vending machines by passing electrical signals to their respective vending machine. These electrical signals are recognized by the vending machine control system, which in an exemplary embodiment is the coin acceptor interface (or other interface), as valid coin inputs. In effect, the vending machine operates as if coins had been input. Under the "pricing" address scheme described below, the network node sends a "credit" to the vending machine which is higher than the highest priced item. This is because pricing at the vending machine relates to the location of an item in the vending machine. When a vend has occurred, the network node detects electrical signals sent from the vending machine. These signals indicate, by the amount of change which is made, the item which has been vended.

A network node can also disable a vending machine by sending a signal to clear any credits (the "escrow") previously sent to the vending machine and stored at the vending machine. Further, a network node can monitor temperature, products sold, products sold out and other operational information of the attached vending machine.

Vending machines 36, 38, and 39 each have a control panel 31 containing selection buttons 33. The number and function of buttons 33 depends upon the type of vending machine being used. For example, a soda machine may have a single button for each type of soda or beverage. A snack food machine (with its greater selection of products) may have buttons, which in combination, can select a snack food by its location in the vending machine. There is no restriction on the amount charged for a particular product in a vending machine with the present invention.

The vending machines are connected to controller 12 via electrical connection line 26. Controller 12 contains a text display screen 14 (LCD display screen), a magnetic card reader 16, a keypad 18, a printer 20 (shown with a receipt 24) and a speaker 22. Although shown separate from vending machines 36, 38, and 39, controller 12 can be mounted on or near the vending machines as dictated by the vending service provider. Controller 12 is used to determine an available credit limit for vending for a given user on any combination of vending machine 36, 37 and 39, as well as allowing/disallowing vending machine use. Alternatively, coins, cash, smart cards, debit cards or bank issued debit cards (such as a Money Access Center card, "MAC" card) can be used instead of a credit card. For purposes of this description, "magnetic card" will be the generic designation for a credit card or a bank issued debit card or a smart card.

A magnetic card (not shown) is passed through card reader 16 and the information from the magnetic strip of the magnetic card is read by card reader 16. Certain portions of or all of this magnetic information is transmitted over a communication line 40 to a remote credit verification location 46. Communication line 40 can take the form of a telephone line, dedicated telephone line, cellular communication line or a local area network. The type of communication line required will depend upon the location and use of a particular vending machine. Appropriate communication hardware for the connection line being used, such as a cellular telephone, will be necessary to establish communication and will be understood by those skilled in the art.

Along with the magnetic card information, a predetermined dollar amount is transmitted to remote credit location 46. For example, a $10 amount may be transmitted, requesting an authorization or approval for vending up to $10 worth of products from vending machines 36, 38 and/or 39. In another embodiment, a user may select the dollar amount for authorization through keyboard 18. A grant or deny signal is then transmitted back over communication line 40 to controller 12 from remote credit verification location 46. Remote credit verification location 46 may be a credit card agency or processor in the case of a credit card, a bank in the case of a bank ATM card or a private organization in the case of a privately provided debit card.

Once controller 12 receives the return signal, controller 12 allows vending up to the authorized amount if a grant signal which authorizes a vend transaction, along with an available credit limit has been provided. Vending is refused if a deny signal has been provided. Appropriate instructions to the user are provided by display 14.

Audible information (voice messages) can also be provided via speaker 22. An example of voice message is a reminder, repeated after a given time period, that a vend should be made or the transaction will be terminated. This could help a user from forgetting that there is an authorized credit still left on the machine which could be used by another if the current user walks away. The problem of "forgetting" is also addressed by a time-out feature which terminates a transaction if no action is taken within a preset period of time. The allowable time between vends for a given transaction authorization can be set by the vending service provider.

Other audible or graphic messages, including instructions, pricing and advertising, can be provided as set up by the vending service provider.

A keypad 18 is also provided for entering key code information. A keypad with one or more keys can be provided, depending on the type of user input which may be required. In the case of a bank issued debit card, such as an ATM card, a personal identification number (PIN) may be required. In an exemplary embodiment of the past invention three keys are provided—a SERVICE key, a HELP key and an END key.

Controller 12 is shown connected to three types of remote locations through communication line 40. Remote credit verification location 46 has already been discussed. Remote service location 42 may be the same as or separate than remote credit verification location 46. Remote service location 42 receives and sends information concerning the operation of vending machine 36, 38 and 39 and controller 12. Information such as additional products (e.g. soda, snack foods) or receipt paper required, or malfunctions may be communicated from vending machines 36, 38 and 39 and controller 12 to remote service location 42.

Remote service location 42 may transmit a sleep signal or an out-of-order signal if it detects a malfunction in either device. Remote service location 42 may also be used to monitor when equipment is in use. Remote location 44 can also be the same as one or more of the other remote locations. It may have a function of receiving transaction information so that the types of use, rates of use and times of use can be monitored and analyzed to enhance vending service. With this information, deliveries of vending products and other supplies may be timed to enhance productivity of the vending machine and those servicing it.

In the embodiment of system 10 shown in FIG. 1, only a credit card reader 16 is shown. An alternate embodiment may use a coin mechanism or bill acceptor mechanism or prepaid card or combination of these mechanisms to pay for the vending. In such an embodiment, the transaction tracking and service capabilities of the present invention are still provided. A coin and/or currency acceptor 17, such as Model MC5 by Mars Electronics (which operates with a Model TRC-6010 interface, also by Mars Electronics) can be used.

When a user has completed all of the user's vending, the number of transactions and cost per transaction are stored in a memory device of controller 12. This information, along with a predetermined number of transaction/cost information for other users will be settled by batch processing at a later time. The predetermined number of transactions may be related to the amount of memory, or requirements of the credit card company/processor (such as every 100 transactions). The batch settlement can also be related to a time period or combination of time period and number of transactions. Batch processing of transaction information is an efficient use of time, as a separate call is not required after every user's vending is complete. The operation of batch processing is discussed in more detail below. In an exemplary embodiment, batch settlement occurs daily.

Figure 2:
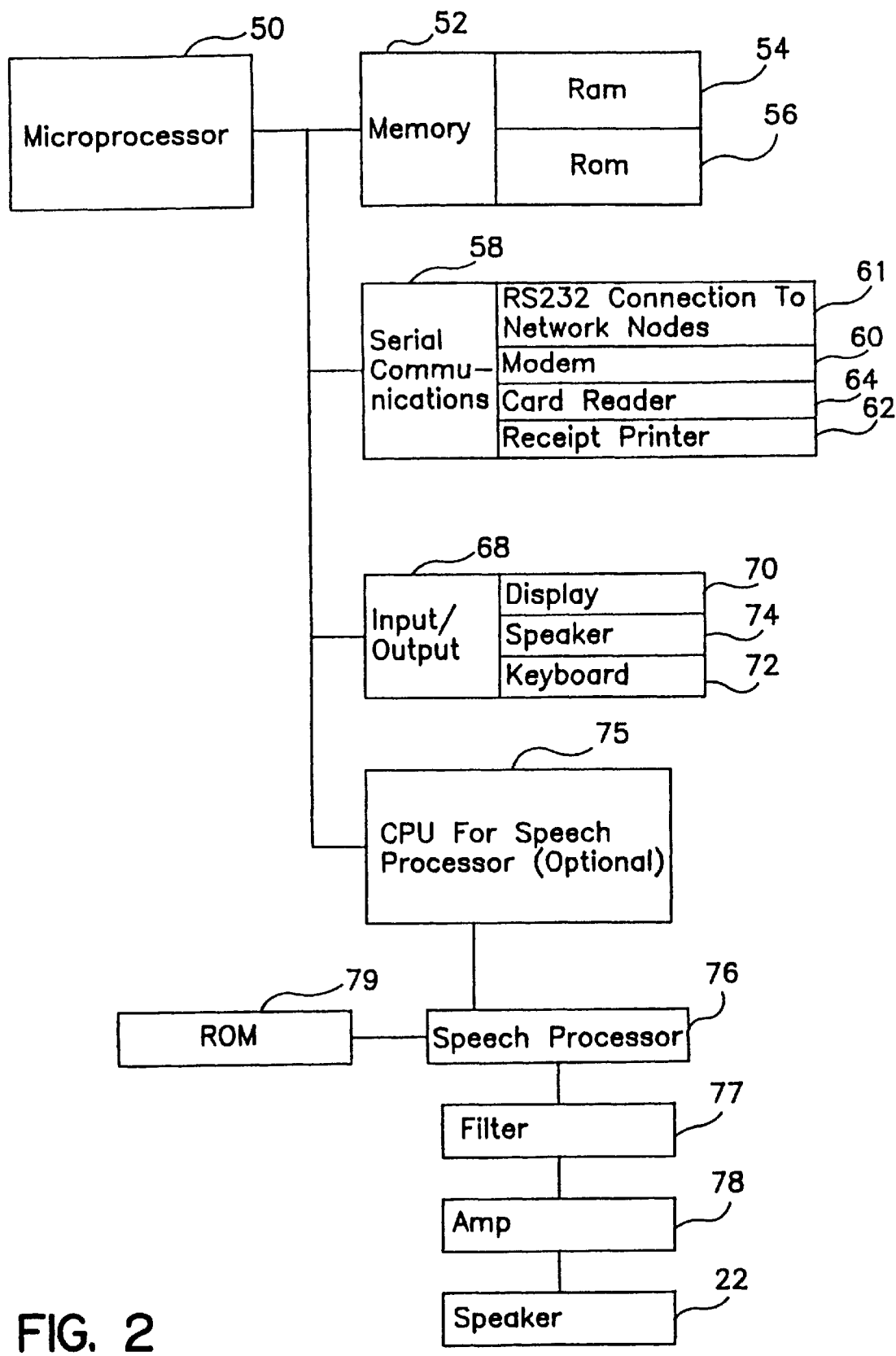
FIG. 2 shows a block schematic diagram of the operational aspects of the present invention.

There is shown in FIG. 2 a block schematic diagram of the logic and communications circuits contained within controller 12.

Controller 12 contains a microprocessor 50 such as the Z086C9320FSC by Zilog. Microprocessor 50 controls the input output (I/O) and memory functions of controller 12. Microprocessor 50 has a memory 52 for storing program information as well as transaction information. Memory 52 is shown consisting of a Read Only Memory (ROM) 54 and a Random Access Memory (RAM) 56. An example RAM is the DS1486 manufactured by Dallas Semiconductor. An example ROM is the 27C256-12/P by Microchip. This ROM chip is a 256K ROM. Microprocessor 50 may also be controlled by an instruction set stored in an Electrically Erasable Read Only Memory (EEROM) such as the 93C56-P serial EEROM also made by Microchip. Other types of memory including removable memory such as disks or removable cards may be used and will be understood by those skilled in the art.

Microprocessor 50 controls input and output through memory 52, serial communications block 58, I/O block 68, speech 75.

Serial communication block 58 encompasses a communication section 60 for communicating with a modem (not shown); a communication block (port) 64 for communicating with a card reader such as card reader 16; and a communication block for communication with a receipt printer such as receipt printer 20. A communication block for communicating with Network Nodes 28, 30 and 32. In an exemplary embodiment, network node communication takes place using the RS232 serial communications protocol. In an exemplary embodiment, the on board modem used for communicating with remote locations is the CH1785 PCB mount modem by Cermetek. This exemplary modem provides communication at 2400 baud. Controller 12 also contains a 6252SA/6250SA/6272SA by Xico as card reader 16 and a receipt printer 20 made by Citizen. Serial communication ports are commonly referred to as "COM" ports. Thus, communication ports 60, 61, 62 and 64 may be referred to as COM1, COM2 and COM3 respectively. The necessary circuitry and connectors for the modem, card reading and receipt printing functions are well known. In an exemplary embodiment of the present invention, and RS232 output is provided by the ADM235LJN integrated circuit by Analog Devices.

Controller 12 also has an optional speech processor 75. Speech controller 76 provides synthesized speech as a source of output through speaker 22. In this way, text information can be provided audibly as well as graphically. Speech is provided through the MSM6295GSK speech controller manufactured by OKI Semiconductor. Whether or not speech processors are provided to the user is optional. This feature can also be remotely activated and modified from a remote location such as remote service location 42. If speech is provided, a volume control mechanism and appropriate amplification and preamplification may be provided.

Speech processor 76 is operated by receiving a control signal from CPU 75. CPU 75 is a Microchip PIC16C54-H-HS/P. CPU 75 receives enabling and menu selection data from microprocessor 50. Based on the enabling and menu data received from microprocessor 50, CPU 77 starts speech processor 76. CPU 70 provides speech processor 76 with control signals and instructs speech processor 76 to play particular prerecorded message accessed from memory 79. Memory 79 is a ROM in an exemplary embodiment of the present invention. Memory 79 contains all of the prerecorded speech data used by speech processor 76. Speech data from memory 79 is converted to an analog signal via digital to analog converter in speech processor 76. The converted analog signal is fed to low pass filter network 80. Low pass filter 80 has a corner frequency of 4 khz in an exemplary embodiment of the present invention. The filtered signal is fed from 80 to audio amplifier 78. Audio amplifier is a Sanyo LA4460 in an exemplary embodiment of the present invention. Finally, the amplified analog signal is passed to speaker 22. An additional embodiment of the present invention an additional speaker is provided for non-speech output such as "BEEP" tones.

Figure 3A:
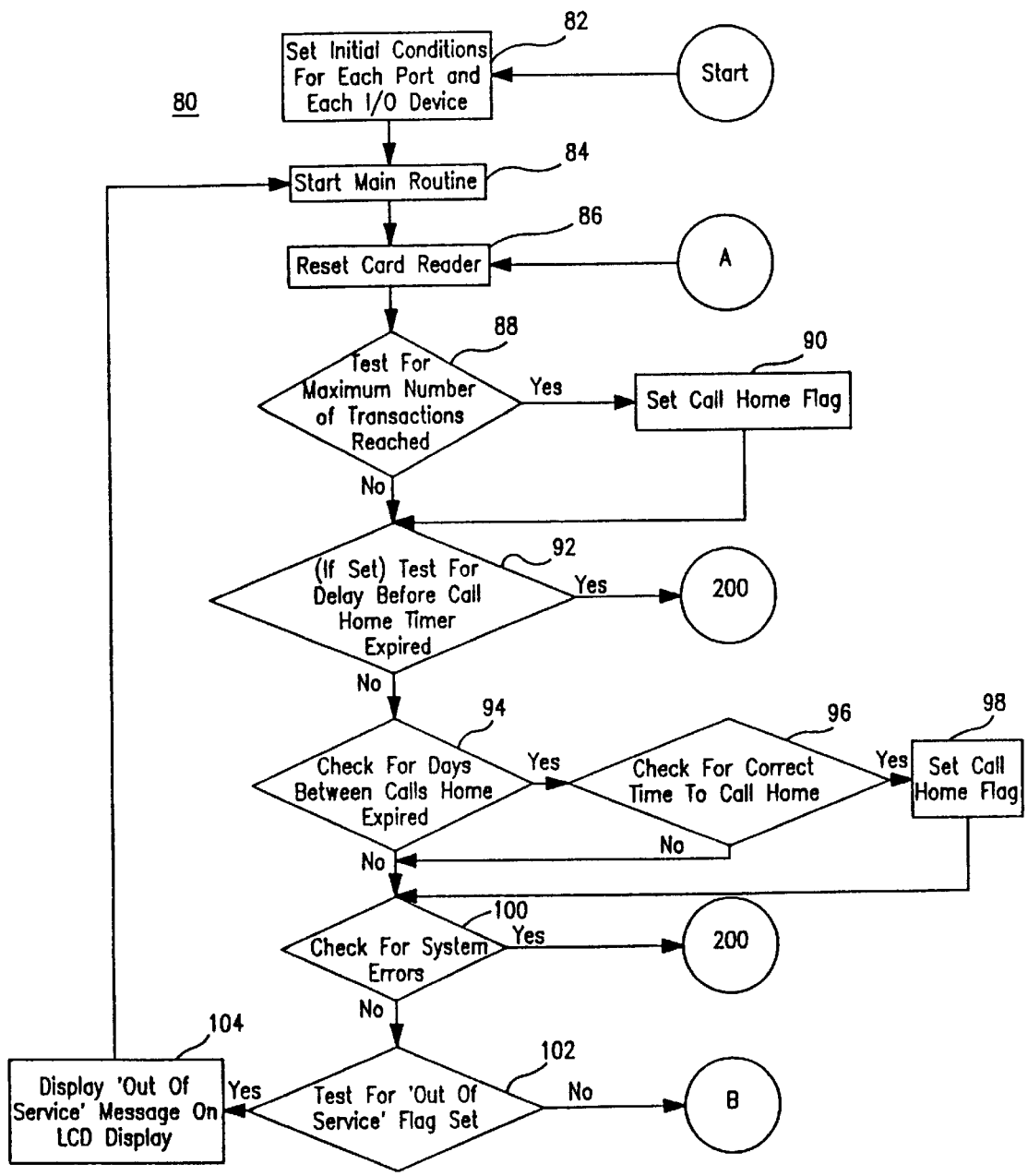
FIGS. 3A and 3B show a flow diagram illustrating the operation of a main routine while awaiting credit card input in accordance with the present invention.
Figure 3B:
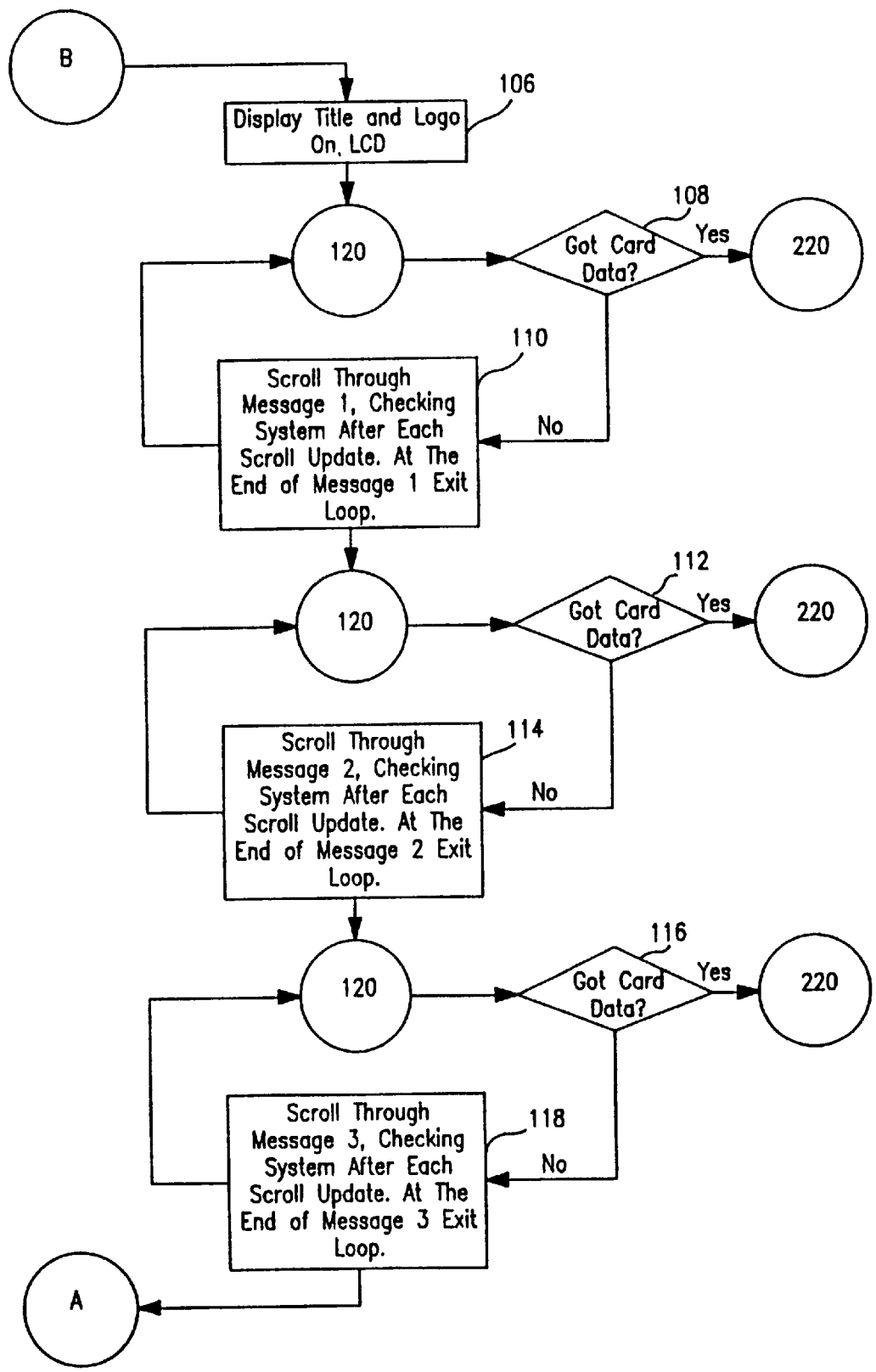

There is shown in FIGS. 3A and 3B flow diagrams of a main routine which checks for system errors, and whether it is time to communicate with a remote location, while waiting for a user to pass a magnetic card through magnetic card reader 16 (or deposit coins or currency if another type of payment means is provided).

Processing begins by entering block 82 where initial conditions for each output port and each input/output device are set. As previously described, the exemplary embodiment of the present invention uses serial ports for serially communicating with peripheral devices.

Processing then continues to block 84 where the main routine is started. In block 86 magnetic card reader 16 is reset. In block 88 a test takes place to determine whether the maximum number of transactions has been reached.

As an exemplary embodiment of the present invention processes transactions as a batch, it has a maximum number of transactions (based on the RAM size) which can be stored in its memory. Accordingly, when a predetermined maximum number of transactions is reached, controller 12 will not take anymore magnetic card inputs and will prepare to forward the multiple transaction information as a batch job over communication line 40 to a remote location.

Figure 8:
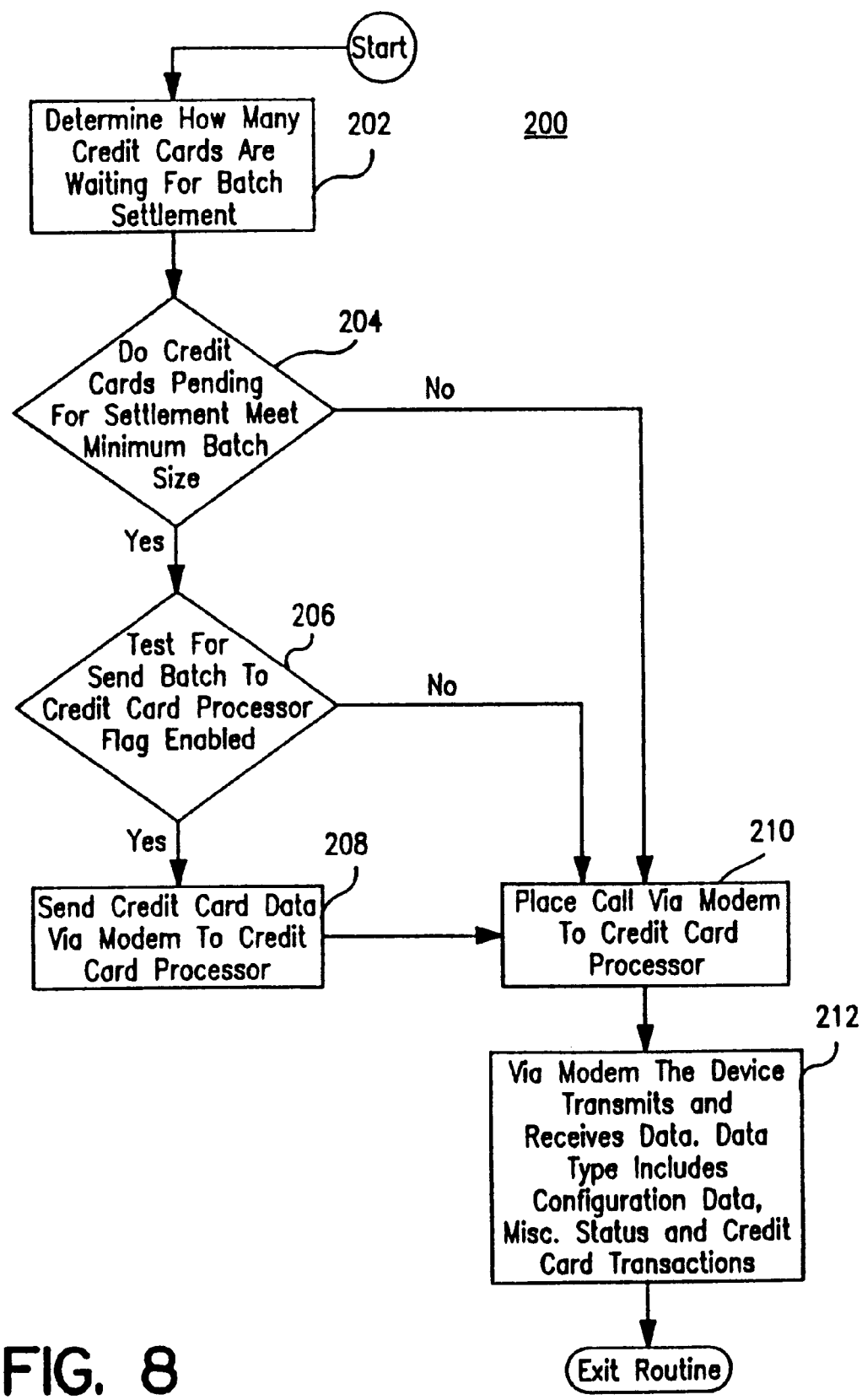
FIG. 8 is a flow diagram showing a routine for sending batched transaction(s) information in accordance with the present invention.

If the determination in block 88 is "yes", processing goes to block 90 where the call home flag is set. The call home flag designates that it is time to call the remote location for batch processing. If the maximum number of transactions is not reached, processing moves to block 92 where it is determined if the call home flag has been set. If the flag has been set, a test is conducted to determine whether there has been a delay before the call home timer has expired. The call home flag can be set at any time in which system 10 is in operation. Controller 12 waits to place a call to a designated remote location ("home"), however, until a predetermined period of inactivity occurs. When the period of inactivity is exceeded, the call is placed. Other variables may be used to determine when to make a call. If the call home flag has been set, processing moves to system subroutine 200 which is shown in FIG. 8. If the call home flag has not been set, processing continues to block 94, where a determination is made as to whether a predetermined number of days between calls to the remote location has expired. If the predetermined number of days between calls to the remote location has expired, processing moves to block 96 where the correct time to call the remote location is checked.

If it is presently an allowable time to call the remote location, the call home flag is set in block 98 (the call home flag is cleared after a successful call is made). Processing then moves to block 100 (also on a negative condition from the determination made in blocks 94 and 96) where a check for certain system errors takes place. Examples of some system errors include printer out of paper, memory full and vending machine problems. If a system error has occurred, processing again moves to the system subroutine 200 shown in FIG. 8. If no system errors have occurred, processing continues to block 102 where a test is made to determine whether the out of service flag has been set. If the out of service flag has been set, processing moves to block 104 where an out of service message is displayed on display 14. Processing then moves back to block 84 and the main routine is once again started.

If the determination in block 102 is negative, processing moves to block 106 shown in FIG. 3B. In block 106 a title and logo are displayed on display 14. The title and logo are stored in one of the memory chips/devices. Processing next moves to Check System subroutine 120 shown in FIG. 4 to check the system. After returning from Check System Subroutine 120, processing moves to block 108 where it is determined whether card data has been obtained, from magnetic card reader 16. If magnetic card data has been obtained processing moves to Transaction Subroutine 220 to process the transaction. If no magnetic card data has been obtained, processing continues to block 110 where a first message is displayed on LCD display 14. In an exemplary embodiment, Message 1 provides identification information: Line 1—"CREDIT VENDING EXPRESS™"; Line 2—"USA Technologies, INC.".

While the first message is being displayed, a loop through check system subroutine 120 and determination block 108 and block 110 continues. A similar routine begins as processing move towards block 112 and block 114. Here, a second message is displayed on display 14. The second message provides operation information for the user: Line 1—"PRESS HELP"; Line 2—"FOR INSTRUCTIONS PRESS HELP." Processing continues to loop through Check System Subroutine 120 and determination block 112 and message display block 114 until the entire text of the second message has been displayed.

A similar process takes place as processing moves to block 116 and display block 118. Here, a third message is displayed. The third message provides instructions for using a magnetic card: Line 1—"SWIPE CARD"; Line 2—"TO MAKE PURCHASES, SWIPE A VALID CREDIT CARD". and the processing loop consisting of Check System Subroutine 120, determination block 116 and message three display block 118 is carried out. If no magnetic card date is determined in block 116 and message three has completed its display in block 118, processing returns to block 86 shown in FIG. 3A.

Figure 4:
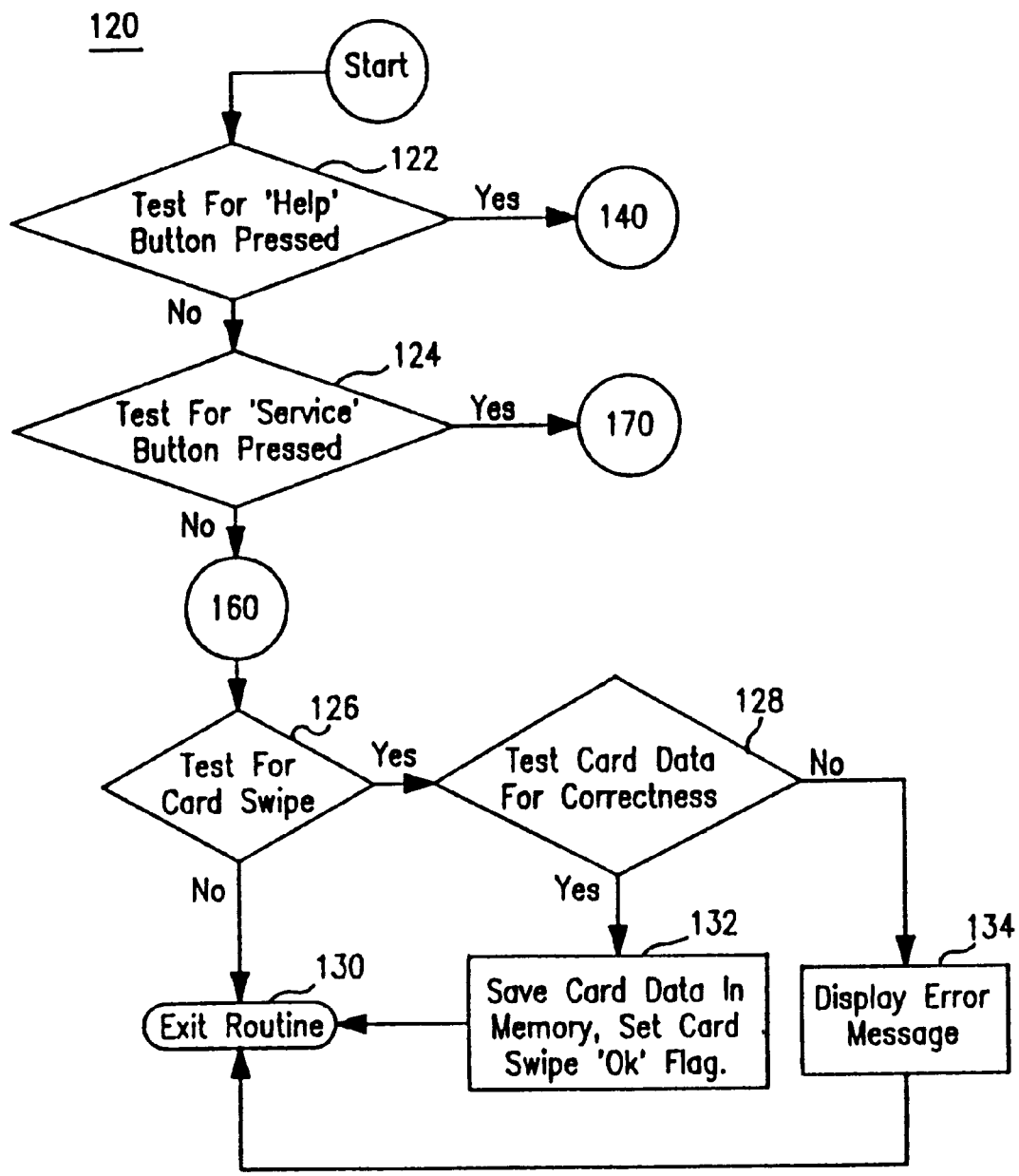
FIG. 4 is a flow diagram showing a subroutine for checking a system of the present invention.

There is shown in FIG. 4 a flow diagram of the Check System Subroutine. Processing begins by entering block 122 where a determination is made whether the HELP button has been depressed. If the HELP button has been depressed, processing moves to the HELP Message Subroutine 140 shown in FIG. 5. If the HELP button has not been depressed, processing moves to block 124 where it is determined whether the SERVICE button has been depressed. If the SERVICE button has been depressed, processing moves to System Service Subroutine 170 shown in FIG. 7. If the SERVICE button has not been depressed, processing moves to flow diagram 160 shown in FIG. 6 to determine whether a magnetic card has passed through magnetic card reader 16.

In block 126 it is determined whether a magnetic card has passed through magnetic card reader 16. If yes, processing moves to block 128 where the correctness of the magnetic card data is tested. If the data is acceptable, processing is moved to block 132 where the magnetic card data is saved in memory and the card read flag is set. If the card data is not acceptable, processing moves to block 134 where an error message is displayed on display 14. Following the display of the error message, the routine is exited.

Figure 5:
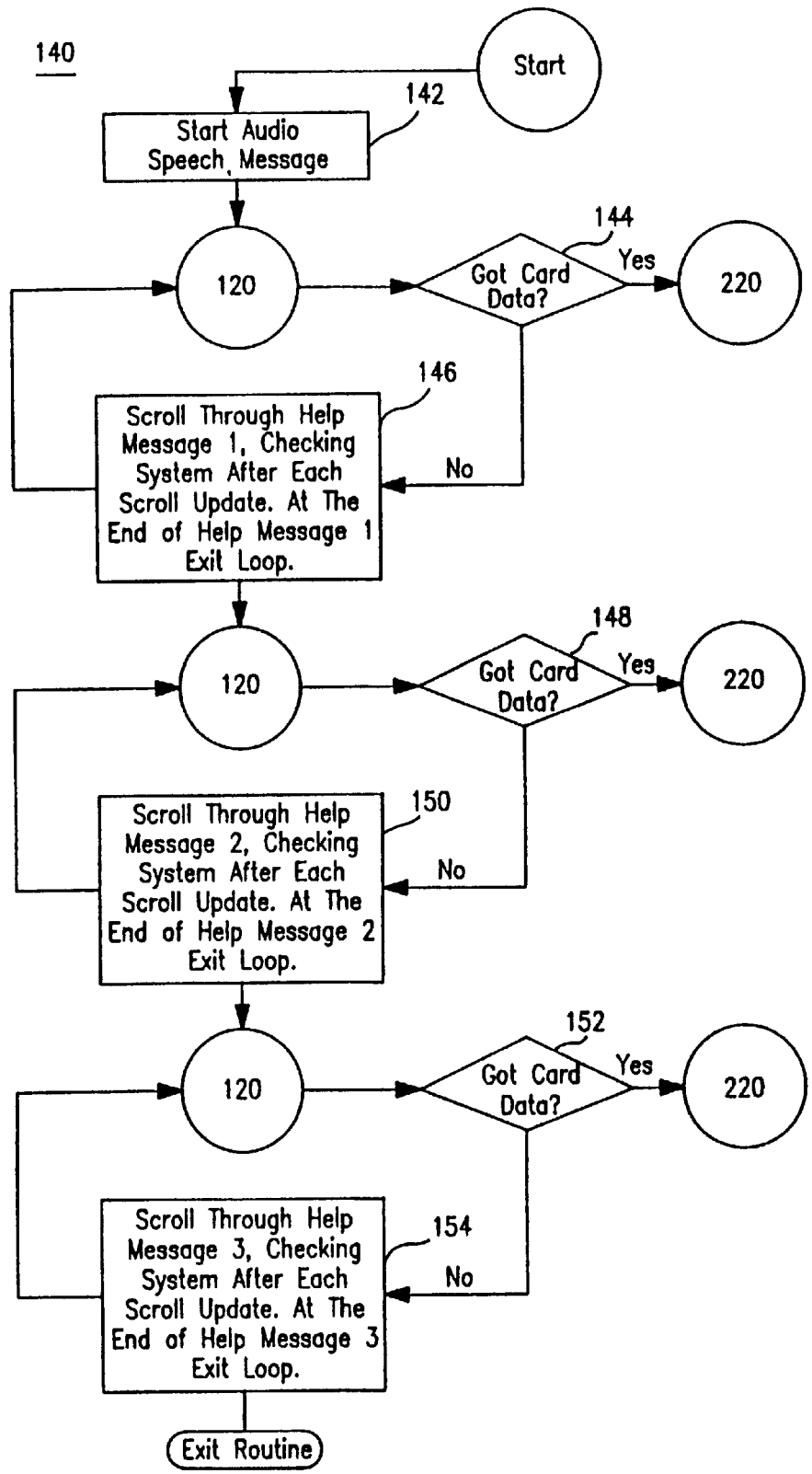
FIG. 5 is a flow diagram showing a help message subroutine used in accordance with the present invention.

There shown in FIG. 5, Help Message Subroutine 140. In an exemplary embodiment, this routine plays a prerecorded audio (voice) message when called. It also cycles through three informative help messages. Either completing the three messages or detection of a magnetic card in magnetic card reader 16 forces an exit out of Help Message Subroutine 140. Pressing a HELP button in keypad 18 will start this routine from the beginning.

Help Message Subroutine 140 begins by entering block 142 where the audio speech message is started. Audio speech is an option which can be selected by the copy service provider. It can also be provided or set from remote location. Processing next enters Check System Subroutine 120 shown in FIG. 4. Processing then moves to decision block 144 where it is determined whether a magnetic card has been passed through magnetic card reader 16. If a magnetic card is detected, processing moves to Transaction Subroutine 220 shown in FIGS. 9A, 9B and 9C. If a magnetic card has not been detected, processing moves to block 146 where the first help message is displayed. Processing continues to loop through Check System Subroutine 120, determination block 144 and message display block 146 until either a magnetic card is detected or the first message has been fully displayed. Processing then moves back to Check System Subroutine 120 and then to decision block 148. Similar to the Check System Subroutine 120, decision block 144 and display block 146 loop above, a similar loop takes place through Check System Subroutine 120, decision block 148 and display block 150 with respect to the second message. Finally, a third message loop consisting of Check System Subroutine 120, decision block 152 and message display block 154 takes place. If by the end of the third message a magnetic card is not detected, the subroutine is exited.

In an exemplary embodiment of the present invention, the following HELP messages are provided.

| Message 1: | Line 1:- | "SWIPE CARD" |
|---|---|---|
| | LINE 2:- | "SWIPE CREDIT CARD FROM RIGHT TO LEFT, MAGNETIC STRIPE FORWARD" |
| Message 2: | Line 1:- | "MAKE PURCHASES" |
| | Line 2:- | "UP0N RECEIVING AUTHORIZATION, MAKE ALL YOUR PURCHASES" |
| Message 3: | Line 1:- | "PRESS END" |
| | | "TO END PURCHASING, PRESS 'END' AND TAKE RECEIPT". |

Figure 6:
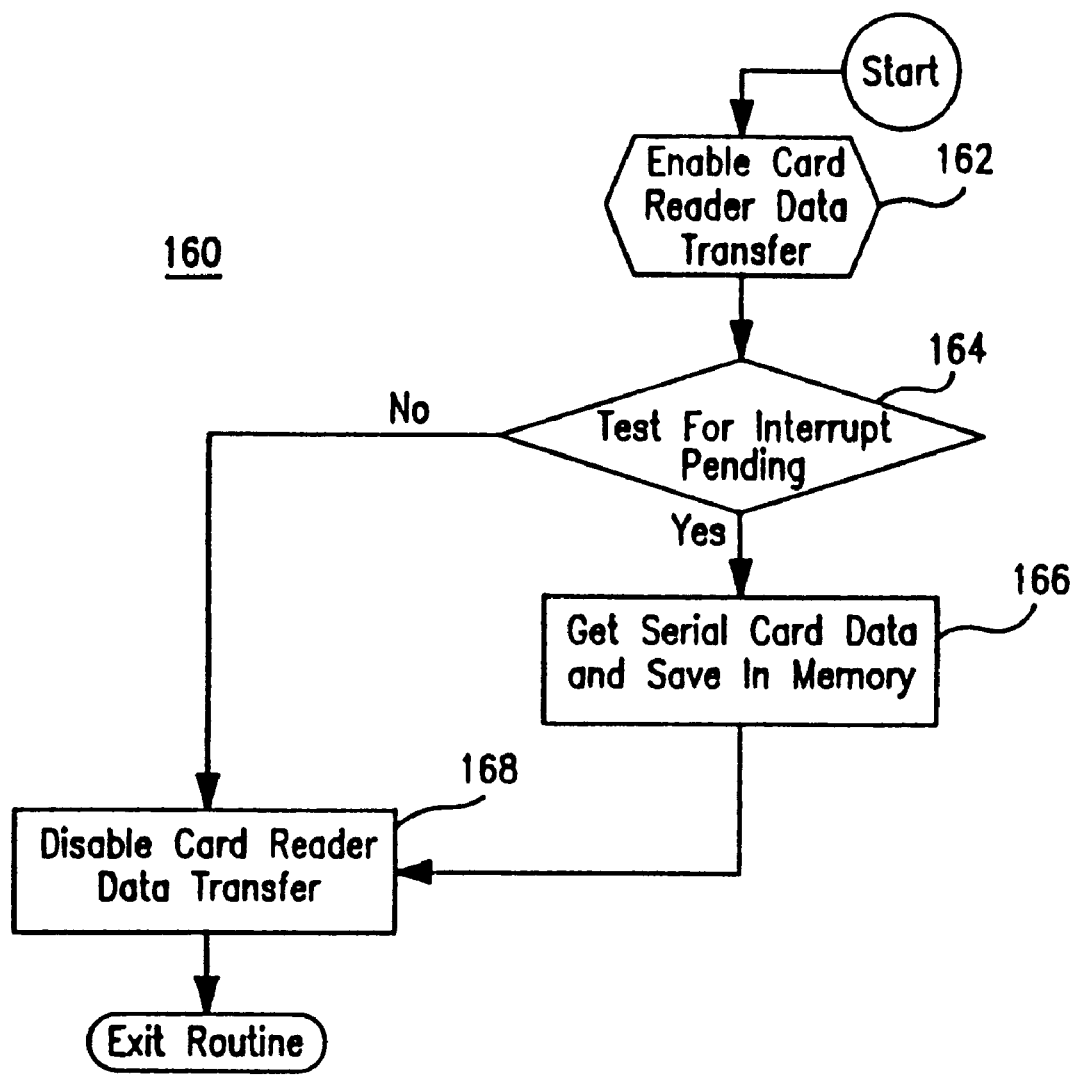
FIG. 6 is a flow diagram showing a card reader interrupt subroutine in accordance with the present invention.

There is shown in FIG. 6, a flow diagram of Magnetic Card Detection Subroutine 160. This routine polls card reader 16 for an interrupt signal. If an interrupt signal is detected, data is transferred from magnetic card reader 16 to microprocessor 50. In an exemplary embodiment, a serial data link between magnetic card reader 16 and microprocessor 50 is used. This data is held in a scratch pad RAM buffer such as RAM 54.

This routine begins by entering block 162 where the magnetic card reader 16 data transfers are enabled. In block 164 a test in undertaken to determine if an interrupt is pending. If an interrupt is pending, processing moves to block 166 where magnetic card data is obtained via a serial data link 64 and saved in RAM memory 54. Processing then moves to block 168 where the data transfer from magnetic card reader 16 is disabled. When complete, this routine is exited.

Figure 7:
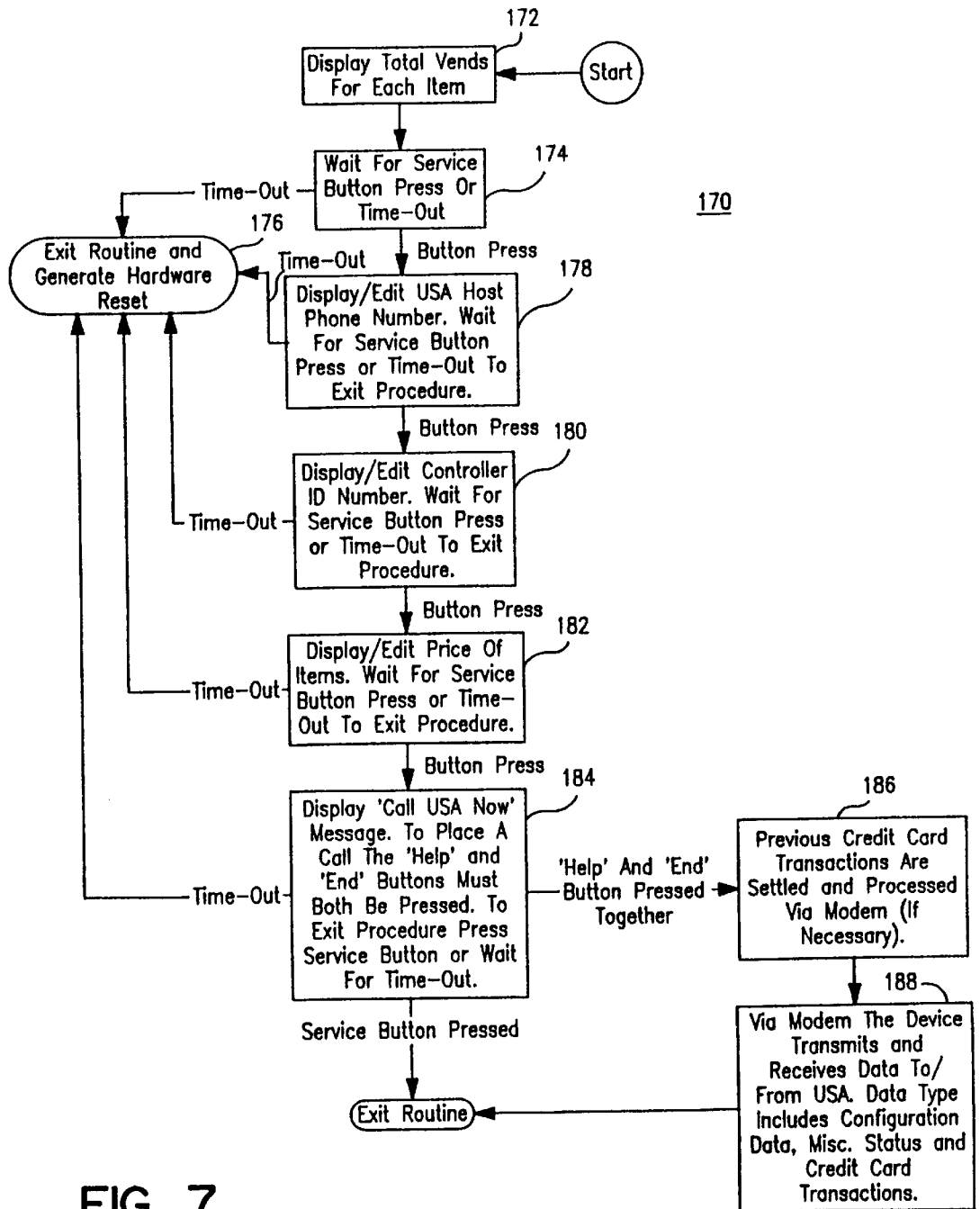
FIG. 7 is a flow diagram showing a service subroutine for monitoring system performance and editing system operational parameters in accordance with the present invention.

There is shown in FIG. 7, Service Subroutine 170. The routine allows a user to view and change various service related fields. These fields may include the cumulative total of purchases which have been made on the device(s) (such as vending machines 36, 38 and 39), the phone number(s) of remote location(s), controller 12/vending machine ID number(s) and other fields tailored to specific site equipment and conditions. The edit process involves using the HELP and END button located on keypad 18 to change the field information and move a cursor displayed on LCD display 14.

Processing begins by entering block 172 where the total number of vends for each item, made on a vending machine are displayed. Processing then continues to block 174 where a delay is effectuated until a SERVICE button is pressed or a time-out occurs. If a time-out occurs, the routine is exited and a hardware reset is generated in block 180. If the service button is pressed, processing moves to block 180 where a remote location phone number is displayed. If a time-out occurs, the routine is exited and a hardware reset is generated. If a service button is pressed, processing moves to block 182 where the vending machine ID number is displayed. If a service button is pressed, processing moves to block 182 where the service operator can edit the prices of items for each item. If a time-out occurs, processing moves to block 176 where the routine is exited.

If the service button is pressed, processing moves to block 184 where the call remote operator message is displayed. In an exemplary embodiment, a remote operator can be called by pressing the HELP and END buttons simultaneously. After block 186, processing moves to block 188 where the previous credit card transactions are settled and processed via modem if necessary. From block 188, Service Subroutine 170 is exited.

There is shown in FIG. 8 System Service Subroutine 200. This routine sends transaction data stored in memory. If a predetermined amount of credit card transactions require settlement, and controller 12 is configured to batch process transaction settlement data directly to a particular remote location (such as remote location 44), batch processing is accomplished first. Following the batch processing, a call is placed to remote service location 42. In an exemplary embodiment, a predetermined minimum amount of credit card transactions is used in the determination.

Processing begins by entering block 202 where a determination of how many credit card transactions are pending settlement. Processing then moves to block 204 where it is determined whether the amount of batch transactions waiting for settlement meet a predetermined batch size (such as a minimum batch size). If predetermined minimum batch size is not met, processing moves to block 210 where a call is made to remote service location 42. If the determination made in block 204 is yes, processing moves to block 206 where it is determined whether a flag has been enabled for sending the batch transaction settlement data. If the flag has not been set, processing moves to block 210 and a call is placed directly to remote service location 42. If the flag has been enabled processing moves to block 208 and the transaction settlement data is sent via modem to a remote location 44. Processing then moves to block 210. Following block 210, processing moves to block 212 where controller 12 transmits and receives data including configuration data, miscellaneous status and credit card transaction information via modem to remote service location 42.

Figure 9A:
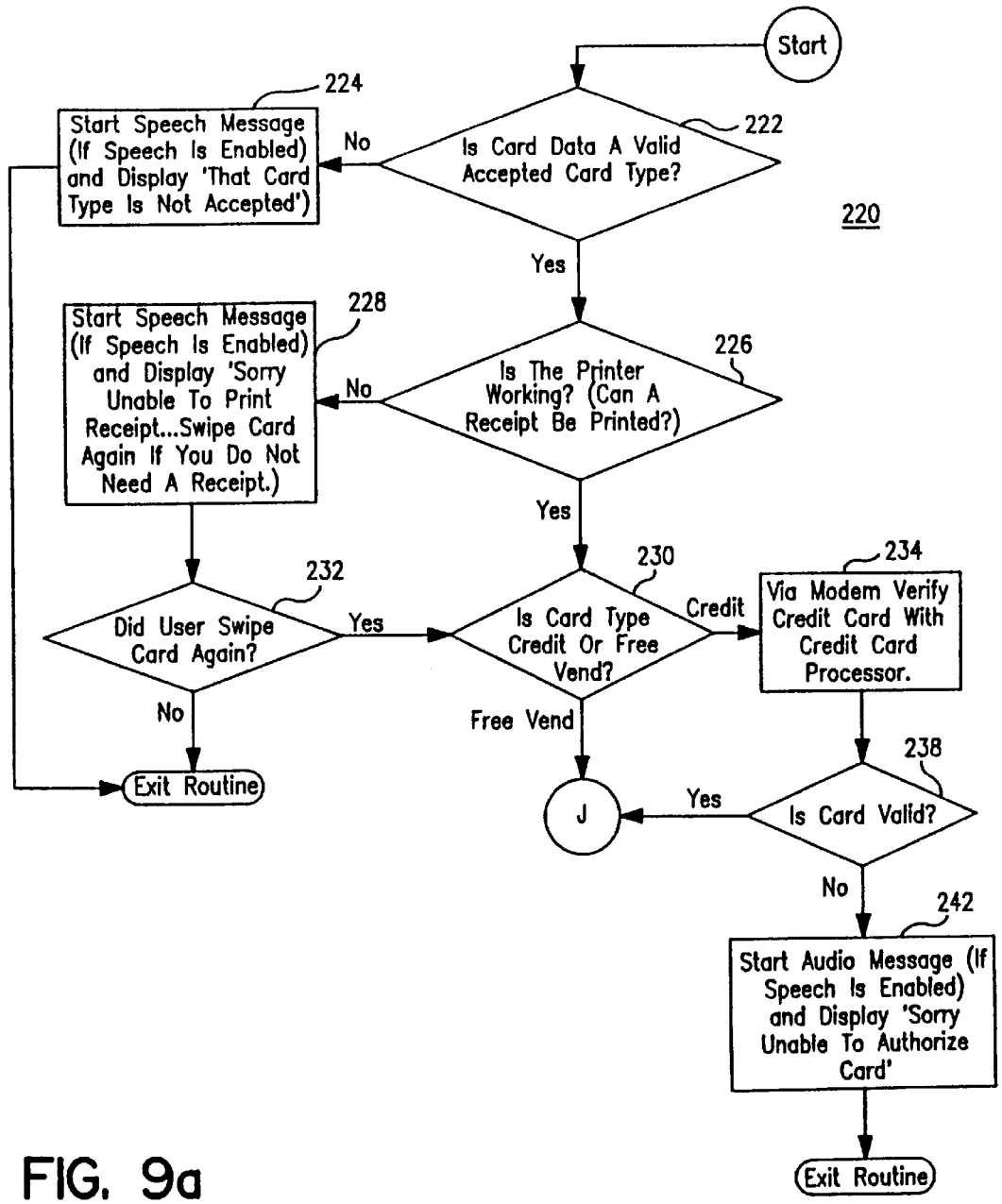
FIGS. 9A, 9B, 9C and 9D are flow diagrams showing a transaction subroutine in accordance with the present invention.

There is shown in FIG. 9A Transaction Subroutine 220. This routine processes the magnetic card data. It also enables/disables a vending machine such as vending machine 36, 38 and 39 for vending as required and terminates a transaction by updating memory variables and printing a receipt 24 on receipt printer 20.

Transaction Subroutine 220 begins by entering decision block 222 where it is determined whether a magnetic card read on magnetic card reader 16 is a valid accepted card type. If not, a message—"THAT CARD TYPE IS NOT ACCEPTED", is displayed on display 14. If the speech option is being used, the message is also played through speaker 22. Transaction subroutine 220 is then exited. If a valid card type is detected, processing moves to block 226 where it is determined whether receipt printer 20 is operating. If not, a message, such as Line 1:—UNABLE TO PRINT RECEIPT Line 2:—SWIPE CARD AGAIN TO CONTINUE is displayed on display 14. If the speech option is being used, the message is broadcast from speaker 22. Other methods of obtaining authorization to proceed without a receipt may also be used, such as pressing a button, authorizing continuation of the vending.

From block 228, processing moves to block 232 where it is determined whether the user passed a magnetic card through magnetic card reader 16. If no card is detected, Transaction Subroutine 220 is exited. If the magnetic card is detected, processing moves to block 230. Processing also moves to block 230 following a positive determination regarding operation of receipt printer 20. In block 230 it is determined whether a credit card or free vend card was read.

If a credit card was read, a credit card verification takes place in block 234 by contacting remote credit verification service 46 over a communication line 40. In block 238 it is determined whether the card is valid. This entails receiving an authorization signal from remote credit verification service 46.

Figure 9B:
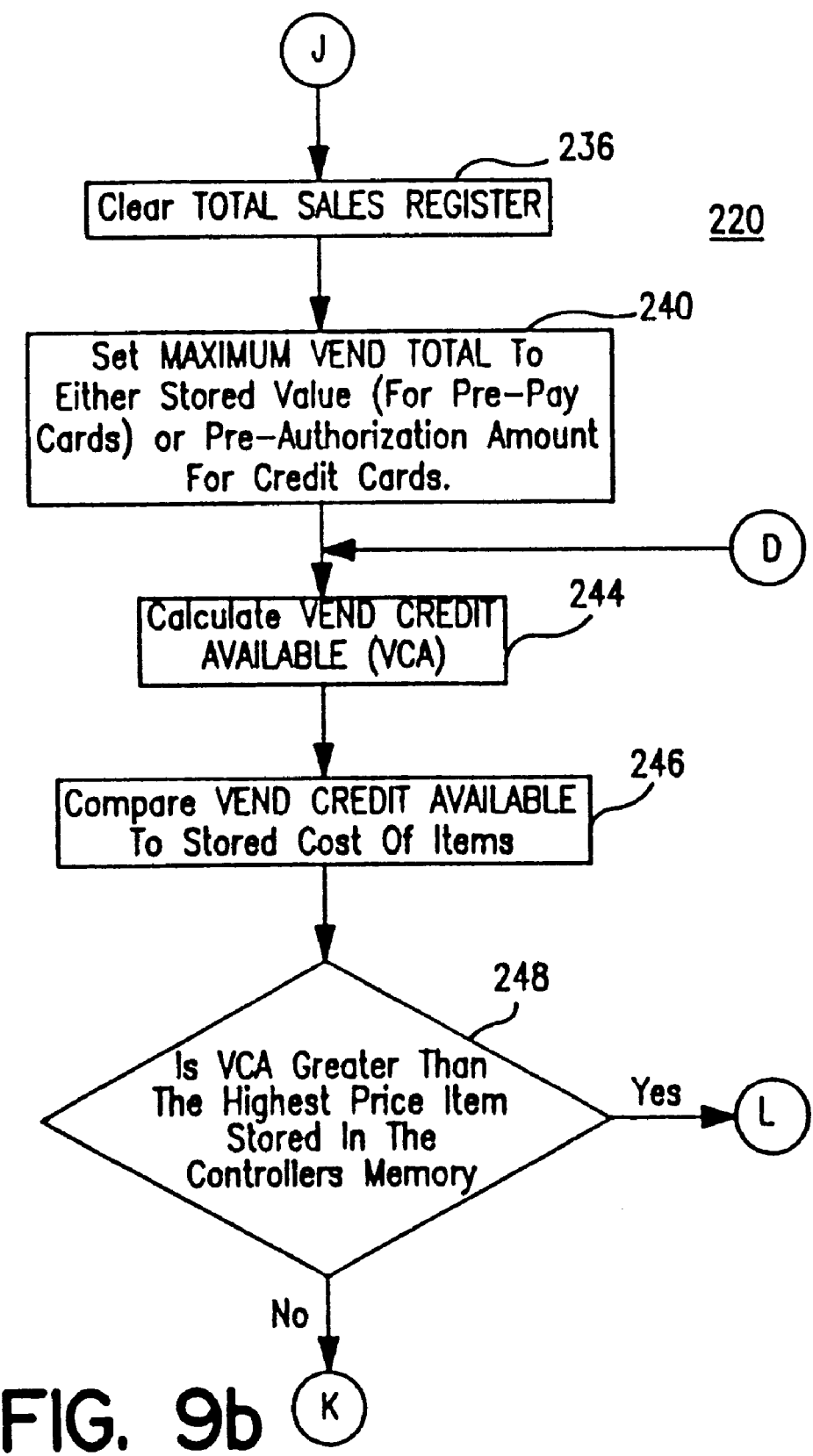

If a free vend card number was detected in block 230 or a valid card determined in block 238, processing moves to block 236 shown in FIG. 9B, where the Total Sales register is cleared. After clearing the Total Sales register, processing continues to block 240 where the Maximum Vend Total (the authorization signal) is set. In an exemplary embodiment, the Maximum Vend Total is set to either a stored value in the case of a prepaid card or to a preauthorized amount in the case of a credit card. It is also possible in other embodiments for the user to enter an amount on a keypad (such as keypad 18) either by entering an exact amount if a numerical pad is present or incrementing/decrementing the amount in preset increments/decrements. Whichever method is used, the result should be that some Maximum Vend Total is stored.

Processing then moves to block 244 where the Vend Credit Available (VCA) is calculated. The VCA is a running total of the available credit of a user. Before a first vend transaction and after receiving the Maximum Vend Total (MVT), the VCA is equal to the MVT. After the first transaction, the VCA equals the MVT minus the cost of the first transaction ($VCA_1$). After a second transaction, the VCA equals $VCA_1$ minus the cost of the second transaction. This continues so that following the nth transaction, the VCA equals $VCA_{n-1}$ minus the cost of the nth transaction.

In block 246, the VCA is compared to the stored cost of items present in the vending machines, such as vending machines 36, 38 and 39. Referring to block 248, it is determined wether the VCA is greater than the highest priced item stored in the controller's memory, to determine if a vend can proceed. If the VCA is not greater, processing moves to block 252 shown in FIG. 9D. In block 252, controller 12 sends an escrow command to each node connection (network node), such as network nodes 28, 30 and 32. Each node connection interacts with its respective vending machine 36, 38 and 39 to remove any credit which may be stored in the memory of the respective vending machines. Processing then moves to decision block 254 where it is determined whether the Total Sales Register is equal to zero. If not, a receipt is printed in block 256. If the total sales register does equal zero, the subroutine is completed.

Figure 9C:
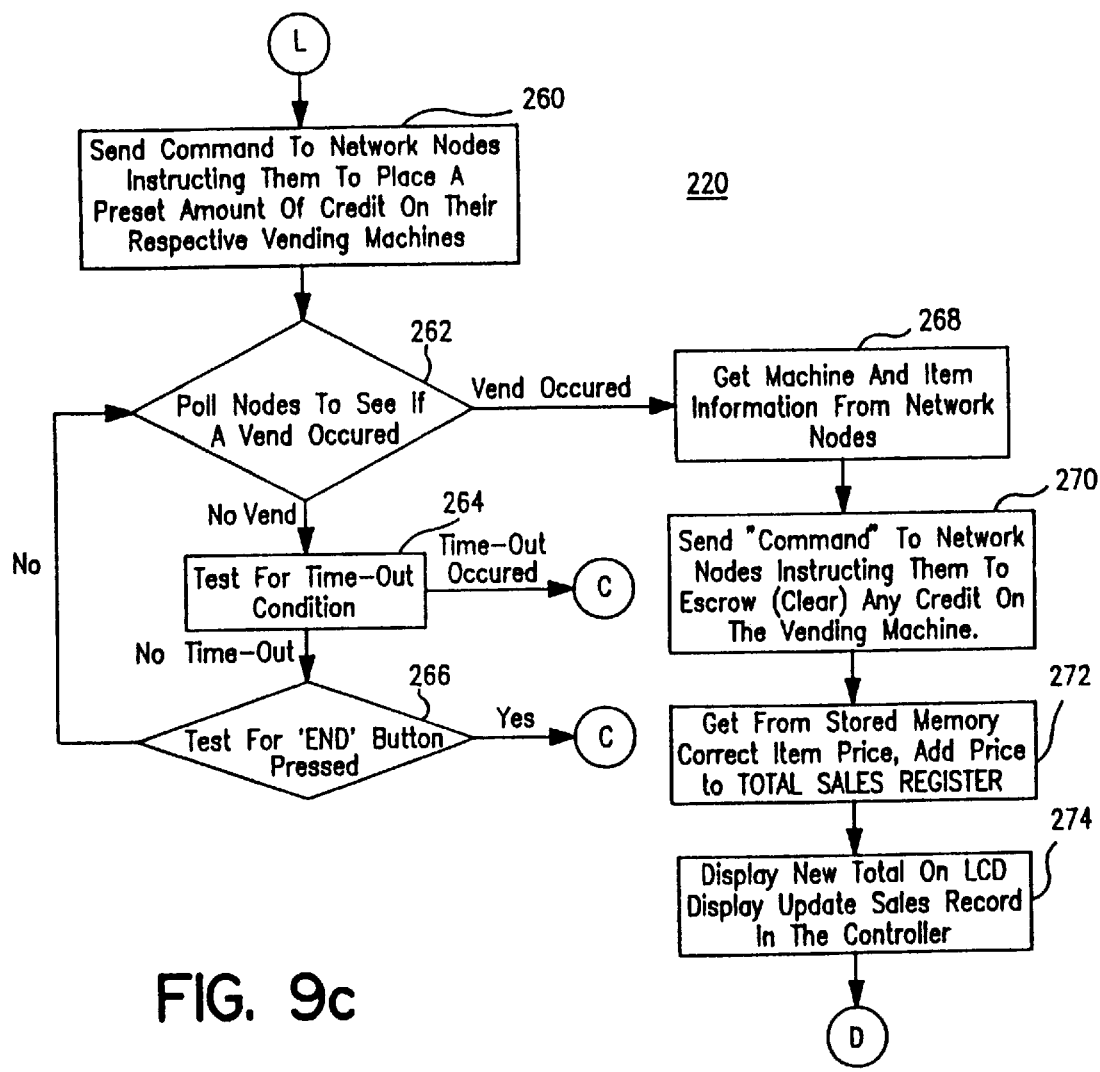
Figure 9D:
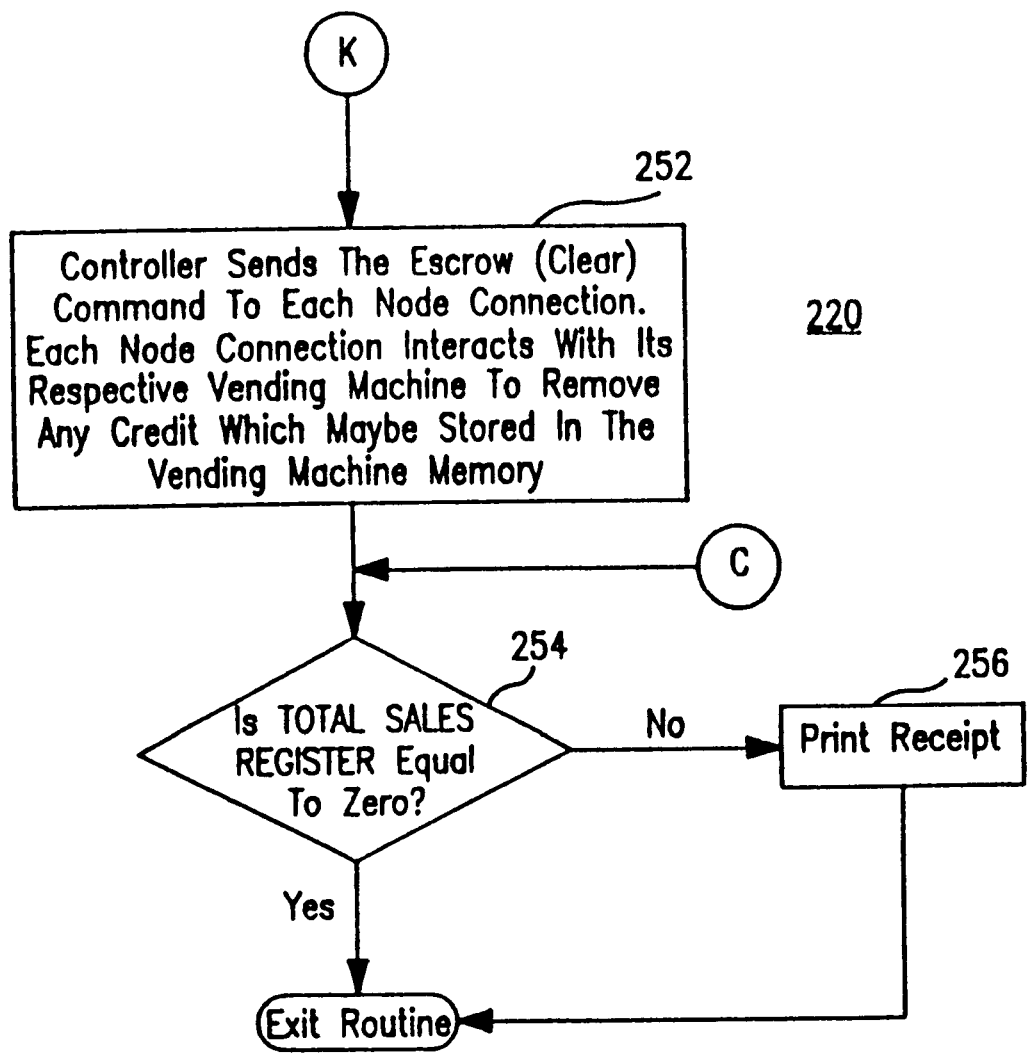

Referring back to FIG. 9B, if the VCA is greater than the highest priced item stored in controller 12's memory as determined in block 248, a vend can proceed and processing moves to block 260 in FIG. 9C. In block 260, a command is sent by controller 12 to each of the network nodes, such as network nodes 28, 30 and 32 instructing the network nodes to place a predetermined amount of credit on the respective vending machines 36, 38 and 39. An exemplary embodiment of the present invention uses an address scheme corresponding to the set up of many typical vending machines. An example vending machine, such as a soda or snack food machine typically provides for a minimum collar amount (e.g. 5 cents) for any item which it vends. By setting a different "price" for each item in the particular vending machine, an effective "address" of the item is established, because there will be a direct correlation between "price" (each price is unique) and the location of the item (which is also unique. If a single item takes up multiple locations in a vending machine, each location would still have a different "price", so that the vends at a particular location can be monitored.

After establishing the addressing scheme, designating the location (and thus each item) by a unique dollar amount, it can be determined which item is being selected by monitoring signals sent from the vending machine control system. In an exemplary embodiment, this is carried out by the coin acceptor interface which determines how much "change" is made when a vend occurs. For example, if a soda machine contains ten locations or columns for loading soda, each location (soda) can be priced at a different amount from 5 cents to 50 cents. By placing a predetermined amount which is greater than 50 cents (e.g. 55 cents) as an authorization on the vending machine, the vending machine will "make change" by subtracting the price of the vended item from the predetermined amount placed on (sent to) the vending machine. The vending machine returns the unused portion of the authorization amount (the "change") to its respective network node. For example, if a user selects a soda which has been set at an internal price in the vending machine at 10 cents, and a predetermined amount of 55 cents is sent to the vending machine, the vending machine will subtract the 10 cents from the 55 cents and provide "change" of 45 cents. Either the respective network node or controller 12 can interpret this 45 cents to determine that the item with a corresponding price of 10 cents was selected by the user.

Other embodiments can allow for the vending of selected items by addressing items at increments (i.e. monetary intervals) in such a way that a first predetermined amount, which is greater than the amount assigned to some items and less than the amount assigned to the highest item (or other items), is used to control vending of the items priced less than the first predetermined amount. A second predetermined amount, which is greater than the highest priced item (or other items) is used to control vending of the items priced higher than the first predetermined amount, but less than the second predetermined amount. In this way, two or more groups of items can be allowed to vend from the same vending machine, depending upon the amount of the current VCA or other restrictions (i.e. time and allowable access).

Stored in the respective network node or controller 12 is a lookup table of actual prices which are to be charged against the MVT of the user to make the purchase. Thus, the soda or item which has been given an internal "price" of 10 cents, will appear in the lookup table with its actual price which is then subtracted from the MVT for the user. When all transactions are complete, the user's credit card will be charged. A similar arrangement will work with a debit card or currency/coins if the system is set up to accept these forms of payment.

Processing then moves to decision block 262 where the network nodes are polled by controller 12 to determine if a vend has occurred. If no vend has occurred, processing moves to decision block 264 where it is determined if a time out has occurred. A time out helps prevent a user from accidentally being charged by leaving controller 12 (and thus the vending machines) in an active state. If a time out has occurred, processing moves to decision block 254 shown in FIG. 9D. If no time out has occurred, processing moves to decision block 266 where it is determined whether the END button has been pressed. If the END button has been pressed, processing moves to decision block 254 shown in FIG. 9D. If the END button has not been pressed, processing cycles back to decision block 262 to repeat the poll of the network node.

If the response to the poll of network nodes in 262 is that a vend has occurred, processing moves to block 268 where the machine and item information is obtained from the network nodes. In block 270, a command is sent to the network nodes instructing them to escrow (clear) any credit on their respective vending machines (such as vending machines 36, 38 and 39). In block 272 the price is obtained from memory and added to the Total Sales register. In block 274, the new total is displayed on a LCD display such as LCD display 14 and the sales record is updated in controller 12. Processing then continues at block 244.

Figure 10A:
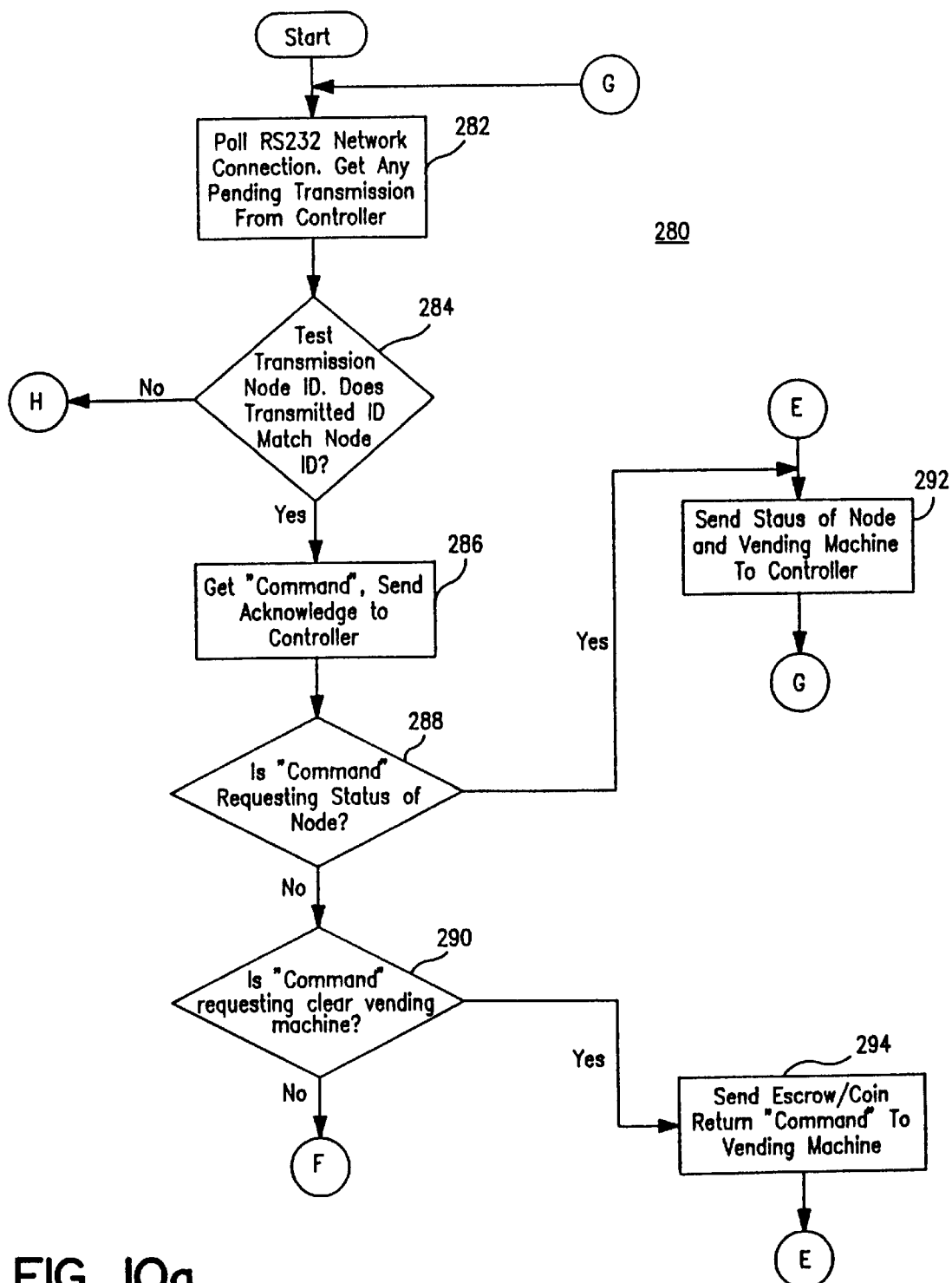
FIGS. 10A and 10B are flow diagrams showing a subroutine for operating the network node interface.
Figure 10B:
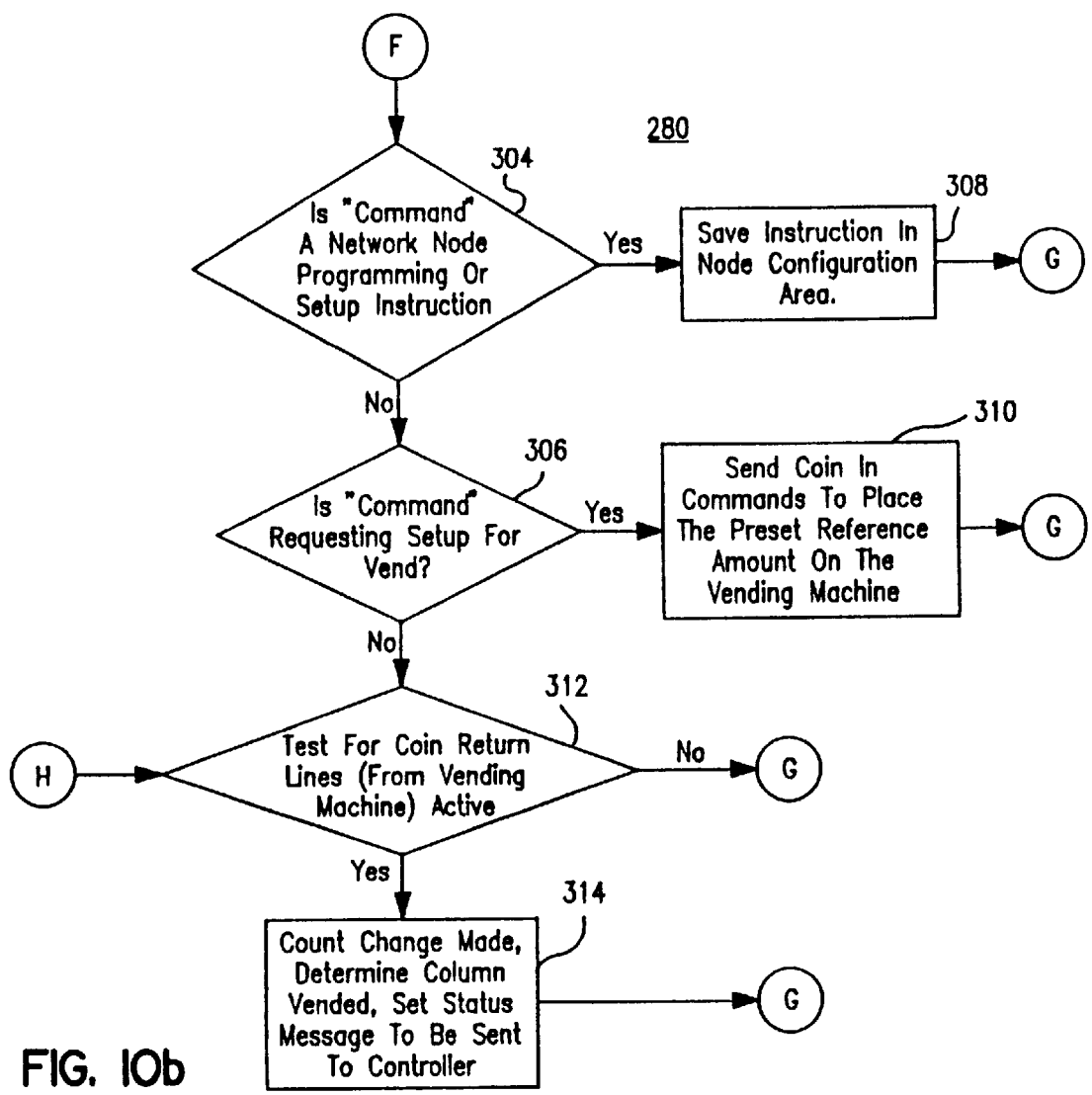

There shown in FIGS. 10A and 10B network node interface subroutine 280. Processing begins at block 282 where controller 12 polls each network node individually. The RS232 network connection 26 connects to network control line 34 which is in turn connects to the network nodes, such as network nodes 28, 30, 32. Controller 12 polls the network by sending a node identification (node ID) with each command (or communication) over the network. When the Node ID for a particular command matches with the actual identification of a particular network node, the network node responds to the command. All other network nodes (in a multi-node system) ignore the command, so that only the desired network node responds to the particular requests of controller 12. If the network node ID sent by controller 12 does not match the identification of the desired network node, processing moves to block 312 shown in FIG. 10B. If a network node recognizes the network node ID sent from controller 12, processing continues to block 286. In block 286, a command is obtained from controller 12 with an acknowledgement of the receipt of the command sent back to controller 12 from the active network node.

In block 288, it is determined whether the command obtained in block 286 requests the status of a particular network node and vending machine attached to the particular network node. If status is requested, processing moves to block 292. If status is not requested, processing moves to block 290 where it is determined whether the command from block 286 is requesting a respective vending machine to clear any remaining authorized credit from the controller 12. Clearing any authorized credit insures that the vending machine is reset for the next vend If a clear is not being requested, processing moves to block 304 shown in FIG. 10B. If a clear is requested, processing moves to block 294 where an escrow/coin return command is transmitted to a selected vending machine.

Referring now to FIG. 10B, in block 304 it is determined whether the command obtained in block 286 is a network node programming or setup instruction. If yes, processing moves to block 308 where the instruction is saved in the configuration file for the respective network node. Processing then moves to block 282 shown in FIG. 10A.

If a network node programming instruction or set up instruction is not received, processing moves to block 306 where it is determined whether the command obtained in block 286 is requesting a setup of a selected vending machine to complete a vend. If such a request has been received processing moves to block 310 where commands to place the preset reference amount on the selected vending machine are sent to the respective vending machine. Following this send, processing returns to block 282 shown in FIG. 10A.

In block 312, it is determined whether or not the coin return lines (or signals from the vending machine indicating a vend has occurred) are active from a selected vending machine. If not, processing continues to block 282 shown in FIG. 10A. If the coin return lines are active, processing moves to block 314 where the change is counted and a determination is made of the specific item being vended. A status message corresponding to the item vended is then sent to controller 12. Processing returns to block 282 shown in FIG. 10A.

While particular embodiments of the present invention are disclosed herein, it is not intended to limit the invention to such disclosure, and changes and modifications may be incorporated and embodied within the scope of the following claims:

What is claimed is:

1. A vending machine control system for controlling vending and managing inventory of items from a plurality of vending machines located proximate to one another at a single vending site, each of said vending machine having a respective coin acceptor interface and respective selection controls for selecting an item to vend at an item price, comprising:

a) a plurality of network means respectively connected to each of said coin acceptor interfaces, for controlling vending and managing inventory, each of said network means coupled to one another by a network, said network means for facilitating communication with each of said vending machines through said network, said network means also for maintaining a status of the vending machine to which said network means is connected;

b) an inventory addressing scheme with each of said items in each of said vending machines assigned a unique price to serve as an item address with said unique price not specified to be said item price, and said network means monitoring a plurality of signals received from respectively connected vending machine control system coin acceptor interfaces, said received signals being said vending machine's control system dispense change control lines; and c) a single control means, coupled to said network at said single vending site, for sending and receiving information to and from each of said vending machines to control vending and monitor inventory at each of said vending machines.

2. A vending machine control system in accordance with claim 1 wherein, said single control means comprises:

a) a single means for accepting a magnetic card to complete a vending transaction at any of said vending machines;

b) means for reading magnetically stored information from said magnetic card;

c) means for obtaining an authorization amount for said transactions for said magnetic card from a credit verification source external to said control means without causing a charge against said magnetic card to occur at the time of obtaining said authorization amount;

d) means for storing said authorization amount;

e) means for communicating said authorization amount to each of said vending machines by way of said network and respective network means;

f) means for operating one or more of said vending machines without exceeding said authorization amount;

g) means for storing transaction information corresponding to said operation of said one or more vending machines and said magnetic information from said magnetic card;

h) means for selectively configuring a batch process to batch transmit magnetic card transaction data to a first remote location whereby settlement records from magnetic card transactions are transmitted to said first location for processing and payment to a merchant; and i) means for subsequently selectively routing configuration data and magnetic card data to a second remote location whereby a service organization can monitor and manage the vending machine by way of configuration data and manually intervene in the magnetic card transaction settlement process when said first remote location declines, rejects or otherwise refuses to accept one or more magnetic card transaction data contained in said batch.

3. The vending machine control system of claim 2, further comprising:

a) storage means for storing transaction information for a predetermined number of transactions; and b) batch means for communicating said stored transactions as a group to an external location for processing said stored transactions to provide charges against each of said magnetic cards associated with said stored transactions.

4. A vending machine control system in accordance with claim 1 wherein said network means comprises at least one network node having a processor and a memory.

5. A vending machine control system in accordance with claim 4 wherein said network node has a unique address.

6. A vending machine control system in accordance with claim 1, further comprising:

a) means for determining if one of said selection controls of one of said vending machines has been activated; and b) means for determining if the item selected by said selection controls can be vended.

7. A method for controlling vending of priced items and managing inventory from a plurality of vending machines located proximate to one another at a single site, each vending machine having a respective coin acceptor interface and respective selection controls for selecting items to vend, comprising the steps of:

a) connecting a separate network node to said coin acceptor interface of each of said plurality of vending machines;

b) connecting each of said plurality of network nodes to each other by way of a network;

c) connecting a single controller to said network at said single site for communicating with said plurality of vending machines by way of their respective network nodes;

d) reading, at said controller, magnetically stored information from a magnetic card;

e) obtaining an authorization amount for transactions for said magnetic card from a credit verification source external to said controller without causing a charge against said magnetic card to occur at the time of obtaining said authorization amount;

f) storing said authorization amount at said controller;

g) communicating said authorization amount to each of said vending machines, thereby allowing vending, from said controller to each of said network nodes;

h) monitoring a plurality of signals sent from said vending machine control system coin acceptor interfaces to determine if a vend at one of said vending machines has been completed, said signals originating from said vending machine control system coin acceptor interface dispense change data lines;

i) determining vending machine inventory from said vending machine by decoding said signals sent from said vending machine coin acceptor interface, said signals corresponding to a preprogrammed unique electronic address of each of said priced items within said vending machine;

j) communicating information acknowledging said completed vend to said controller from said network node connected to said vending machine where said completed vend took place; and preventing further vending until a new authorization amount is determined and communicated to each of said vending machines.

8. A method for controlling vending of priced items from one or more vending machines in accordance with claim 7, wherein the step of determining if a vend has been completed at one of said vending machines, comprises the step of determining whether said coin acceptor interface is sending a completed vend signal.

9. A method for controlling vending of priced items from one or more vending machines in accordance with claim 7, wherein the step of communicating information acknowledging said completed vend to said controller from said network node connected to said vending machine where said completed vend took place, comprises the steps of:
   a) polling each of said network nodes to determine status of its respective vending machine; and
   b) receiving a status report from each of said network nodes.

10. A method for controlling vending of priced items from one or more vending machines in accordance with claim 7, wherein the step of preventing further vending until a new authorization amount is determined, comprises the steps of:
   a) clearing any authorization amount stored at any of said vending machines;
   b) reading said first vend credit available amount;
   c) determining a price for said completed vend;
   d) subtracting said price for said completed vend from said authorization amount to produce said new authorization amount; and
   e) determining if further vending is permitted based on said new authorization amount.

11. The method of claim 7, further comprising the steps of:
   a) storing transaction information for a predetermined number of transactions; and
   b) communicating said stored transactions as a group to an external location for processing said stored transactions to provide charges against each of said magnetic cards associated with said stored transactions.

* * * * *